(12) United States Patent  
Ono et al.

(10) Patent No.: US 9,272,169 B2
(45) Date of Patent: Mar. 1, 2016

(54) FIRE BARRIER PROTECTION FOR AIRPLANES COMPRISING GRAPHITE FILMS

(75) Inventors: Kazuhiro Ono, Houston, TX (US); Yasushi Nishikawa, Osaka (JP); Takashi Inada, Osaka (JP)

(73) Assignee: KANEKA CORPORATION, Osaka (JP)

( * ) Notice: Subject to any disclaimer, the term of this patent is extended or adjusted under 35 U.S.C. 154(b) by 484 days.

(21) Appl. No.: 12/807,717

(22) Filed: Sep. 13, 2010

(65) Prior Publication Data

US 2011/0114342 A1    May 19, 2011

Related U.S. Application Data

(63) Continuation-in-part of application No. PCT/US2009/001590, filed on Mar. 13, 2009.

(60) Provisional application No. 61/192,637, filed on Sep. 19, 2008, provisional application No. 61/069,511, filed on Mar. 14, 2008.

(51) Int. Cl.
*A62C 2/00* (2006.01)
*A62C 2/06* (2006.01)
(Continued)

(52) U.S. Cl.
CPC . *A62C 2/065* (2013.01); *A62C 3/08* (2013.01); *A62C 3/10* (2013.01); *B32B 5/18* (2013.01); *B32B 9/007* (2013.01); *B32B 9/041* (2013.01); *B32B 9/045* (2013.01); *B32B 9/046* (2013.01); *B32B 9/047* (2013.01); *B32B 15/20* (2013.01); *B32B 27/18* (2013.01); *B32B 27/38* (2013.01); *B63B 3/68* (2013.01); *E02B 17/0017* (2013.01); *E04B 1/94* (2013.01); *B32B 2262/10* (2013.01); *B32B 2262/106* (2013.01); *B32B 2266/0278* (2013.01); *B32B 2307/102*
(Continued)

(58) Field of Classification Search
CPC .................................. A62C 2/10; A62C 2/06
USPC .................... 169/43–50, 54, 64; 428/920
See application file for complete search history.

(56) References Cited

U.S. PATENT DOCUMENTS 3,285,696 A * 11/1966 Tsunoda .................. 423/447.6
3,404,061 A    10/1968 Shane et al.
(Continued)

FOREIGN PATENT DOCUMENTS

EP    0527046    2/1993
GB    2181093    4/1987

OTHER PUBLICATIONS

PCT International Search Report of International Application No. PCT/US2009/001590, 3 pgs., mailed Oct. 21, 2009.

*Primary Examiner* — Davis Hwu
(74) *Attorney, Agent, or Firm* — Kagan Binder, PLLC

(57) ABSTRACT

A fire barrier system for use in aircraft, ship or offshore drilling platform comprises a flexible graphite sheet. Methods of providing fire barrier protection in an aircraft, ship or offshore drilling platform comprise installing the described fire barrier system in the aircraft, ship or offshore drilling platform. Additionally, the fire barrier system when installed in the aircraft, ship or offshore drilling platform is described.

23 Claims, 22 Drawing Sheets

(51) Int. Cl.
    *A62C 3/08*         (2006.01)
    *A62C 3/10*         (2006.01)
    *B63B 3/68*         (2006.01)
    *E02B 17/00*       (2006.01)
    *E04B 1/94*         (2006.01)
    *B32B 5/18*         (2006.01)
    *B32B 9/00*         (2006.01)
    *B32B 9/04*         (2006.01)
    *B32B 15/20*       (2006.01)
    *B32B 27/18*       (2006.01)
    *B32B 27/38*       (2006.01)
    *B63B 43/00*       (2006.01)

(52) U.S. Cl.
    CPC .... (2013.01); *B32B 2307/212* (2013.01); *B32B 2307/302* (2013.01); *B32B 2307/306* (2013.01); *B32B 2307/3065* (2013.01); *B32B 2307/704* (2013.01); *B32B 2307/714* (2013.01); *B32B 2307/72* (2013.01); *B32B 2307/7265* (2013.01); *B32B 2605/18* (2013.01); *B63B 43/00* (2013.01); *C01P 2004/60* (2013.01)

(56) References Cited

U.S. PATENT DOCUMENTS

| | | | |
|---|---|---|---|
| 3,831,318 A * | 8/1974 | Richmond | 49/31 |
| 4,255,483 A * | 3/1981 | Byrd et al. | 442/136 |
| 4,403,075 A * | 9/1983 | Byrd et al. | 525/418 |
| 4,702,861 A * | 10/1987 | Farnum | 252/601 |
| 5,176,863 A * | 1/1993 | Howard | 264/113 |
| 5,376,450 A | 12/1994 | Greinke et al. | |
| 5,418,050 A | 5/1995 | Keefover-Ring et al. | |
| 5,424,105 A | 6/1995 | Stewart et al. | |
| 5,705,006 A | 1/1998 | Roudebush et al. | |
| 5,759,659 A | 6/1998 | Sanocki et al. | |
| 5,830,809 A * | 11/1998 | Howard et al. | 442/59 |
| 5,985,362 A | 11/1999 | Specht et al. | |
| 6,087,007 A * | 7/2000 | Fujii et al. | 428/412 |
| 6,143,218 A | 11/2000 | Mercuri | |
| 6,245,400 B1 | 6/2001 | Tzeng et al. | |
| 6,322,022 B1 | 11/2001 | Fay et al. | |
| 6,551,951 B1 | 4/2003 | Fay et al. | |
| 6,670,291 B1 | 12/2003 | Tompkins et al. | |
| 6,764,759 B2 * | 7/2004 | Duvall et al. | 428/348 |
| 2007/0032589 A1 | 2/2007 | Nishikawa et al. | |
| 2007/0039744 A1 * | 2/2007 | Pavesi | 169/49 |

\* cited by examiner

FIRE BARRIER PROTECTION FOR AIRPLANES COMPRISING GRAPHITE FILMS This is a continuation-in-part of International Application PCT/US2009/001590, with an international filing date of 13 Mar. 2009. This application claims the benefit of U.S. Provisional Application Ser. No. 61/069,511 filed on Mar. 14, 2008, entitled "FIRE BARRIER PROTECTION FOR AIRPLANES COMPRISING GRAPHITE FILMS," and U.S. Provisional Application Ser. No. 61/192,637 filed on Sep. 19, 2008, entitled "FIRE BARRIER PROTECTION FOR AIRPLANES COMPRISING GRAPHITE FILMS." The above applications are incorporated herein by reference in their entireties.

FIELD OF THE INVENTION

The present invention relates to fire barrier protection on an aircraft, ship or offshore drilling platform. More specifically, the present invention relates to fire barrier protection comprising a graphite sheet on an aircraft, ship or offshore drilling platform.

BACKGROUND OF THE INVENTION

Airline safety is of great concern to public. Tragically, there have been a number of incidents where an otherwise survivable accident has had fatal results due to ignition of the interior of the aircraft caused by burning jet fuel external to the aircraft. While airports in particular are well staffed and equipped to fight fires, there is often a brief time delay before fire terminating measures can be put in place, simply because the equipment is not at the location of the fire. In such a circumstance, the difference of a few short minutes in prevention of burnthough of the fuselage of an aircraft can save lives and property in a postcrash fire accident in which the fuselage remains intact. See, e.g. the report to the FAA (Federal Aviation Administration) entitled "Full-Scale Test Evaluation of Aircraft Fuel Fire Burnthrough Resistance Improvements" by Timothy R. Marker. DOT/FAA/AR-98/52 January 1999, Final Report. Additionally, the FAA is adopting upgraded flammability standards for thermal and acoustic insulation material used in transport category airplanes. The federal regulation FAR 25.856(b) applies to insulation materials installed in the lower half of the fuselage because that area is most susceptible to burnthrough from an external fuel fire, and applies to aircraft having a passenger capacity of 20 or greater. Similarly, there have been a number of fire accidents on ships and on offshore drilling platforms in which prevention of burnthough of structures can save lives and property.

Blankets have previously been suggested for use in providing thermal and/or acoustic insulation in aircraft and other vehicles to shield passengers from noise and temperature extremes. See U.S. Pat. No. 5,759,659, which describes an insulation blanket that includes fibrous insulation, foam insulation, or a combination thereof encased within a heat-sealable polymer comprising a rubber-toughened thermoplastic polyolefin. The thermoplastic polyolefin is described as preferably being flame retardant as well. See column 4, lines 14-26, which notes that flame retardancy may be achieved by blending the thermoplastic polyolefin with one or more flame retardant agents including intumescent materials, e.g., "expanding graphite." The blanket additionally comprises a high temperature resistant layer 16 as part of the construction, such as ceramic paper, woven ceramic fibers, woven fiberglass fibers, ceramic non-woven scrims, and fiberglass non-woven scrims. See column 5, lines 52-65. Similar burn through resistant nonwoven mats are described in U.S. Pat. No. 6,551,951. The mat is made up of non-respirable and/or biosoluble base fibers that are stated to be capable of retaining their integrity and dimensional stability during 4 minutes of exposure to a fluctuating high pressure flame front at a temperature of 1100° C. Examples given of non-respirable base fibers which make up the nonwoven mat are quartz fibers; aluminosilicate, aluminoborosilicate or alumina ceramic oxide fibers; partially oxidized pitch based fibers; and partially oxidized polyacrylonitrile fibers having mean diameters greater than 6 microns. See the Abstract.

Laminate sheet materials for fire barrier applications are described in U.S. Pat. No. 6,670,291. The laminate comprises a first layer comprised of polymeric material and a second layer comprised of non-metallic fibers. See the Abstract. The second layer may be, for example, a laminate may comprise vermiculite coated paper having metal oxide coated regions thereon, available from the 3M Company under the trade designation "NEXTEL Flame Stopping Dot Paper." See column 17, lines 50-55.

Flexible graphite is a well-known material used in a variety of industrial, commercial and domestic applications because of its chemical inertness and unique electrical and thermal conduction properties. It is of particular use as a gasketing or sealing material in automobile engines, piping flanges and vessel joints and as a fire proof covering for walls or floors. See U.S. Pat. No. 6,245,400.

A method for making expandable graphite particles is described in U.S. Pat. No. 3,404,061, wherein graphite flakes are intercalated by dispersing the flakes in a solution containing an oxidizing agent e.g., a mixture of nitric and sulfuric acid. Upon exposure to high temperature, the particles of intercalated graphite expand in dimension as much as 80 to 1000 or more times its original volume in an accordion-like fashion in the c-direction, i.e. in the direction perpendicular to the crystalline planes of the constituent graphite particles. The exfoliated graphite particles are vermiform in appearance, and are therefore commonly referred to as worms. The worms, i.e. expanded graphite, may be compressed together into flexible sheets which, unlike the original graphite flakes, can be formed and cut into various shapes for gasket and sealing purposes.

An alternative embodiment of a flexible graphite sheet is made in U.S. Pat. No. 6,143,218 by compressing a mixture of fine particles of intercalated, exfoliated, expanded natural graphite with fine particles of intercalated, unexpanded, expandable particles of natural graphite, the unexpanded particles being more finely sized than the expanded particles. The resulting sheet of flexible graphite is stated to exhibit improved fire retardant and sealability properties.

Filmy graphite materials are described in US Patent Application No. 2007/0032589 (the "'589 application"). In the background section of this application, it is pointed out that a process has been developed in which a special polymer film is graphitized by direct heat treatment (hereinafter, referred to as a "polymer graphitization process"). Examples of the polymer film used for this purpose include films containing polyoxadiazole, polyimide, polyphenylenevinylene, polybenzimidazole, polybenzoxazole, polythiazole, or polyamide. The '589 application goes on to describe a method for providing a thick filmy graphite having excellent physical properties using a short-time heat treatment at relatively low temperatures. In this application, it was noted that by controlling the molecular structure and molecular orientation of the polyimide (particularly the birefringence or coefficient of linear expansion), transformation into a quality graphite is enabled.

SUMMARY OF THE INVENTION

Fire barrier protection on aircraft is particularly challenging, because while excellent fire protection is clearly desirable, space and weight constraints limit the effectiveness of solutions that previously have been proposed.

It has been found that superior fire barrier systems may be provided in aircraft when the system comprises a flexible graphite sheet. The fire barrier systems may be applied to a ship or to an offshore drilling platform as well. Such systems exhibit superior fire barrier properties, while at the same time providing substantial reduction in weight and/or bulk of the fire barrier system. Specific constructions of fire barrier systems that are particularly useful in providing fire barrier protection in aircraft are described. Examples of such constructions include laminates for enclosing an insulation bag, the laminate comprising as one of the layers a flexible graphite sheet; insulation blankets comprising as one layer of the insulation blanket a flexible graphite sheet; laminar constructions comprising a layer of sound insulative foam and a fire barrier layer that is a flexible graphite sheet; and fire resistant repair patches for aircraft cargo bay liners comprising as one of the layers a flexible graphite sheet.

Methods of providing fire barrier protection in an aircraft comprising installing in the aircraft a fire barrier system as described above, and also the fire barrier system as installed in an aircraft comprising a flexible graphite sheet are also described. The methods may also be applied to a ship or to an offshore drilling platform.

Fire barrier systems comprising a flexible graphite sheet are particularly beneficial, because they exhibit little or no flame penetration because the graphite sheet is a continuous film. Further, the graphite sheet has a very low weight, which is a substantial benefit in the aviation arts. Similarly, the weight and space advantages of the present sheets provide substantial benefits in the ship or the offshore drilling platform arts. It further has been discovered that embodiments of the present invention wherein the graphite sheet is a graphitized polymer sheet, as distinguished from a graphite sheet prepared from natural graphite, provides a particular advantage, because the graphitized polymer sheet exhibits less outgassing and moisture absorbance, and also can effectively be prepared at lower sheet weights.

Fire barrier systems comprising a flexible graphite sheet exhibit exceptional performance as compared to prior art ceramic paper fire barriers, because graphite films as described herein remain flexible even after 6 minutes of flame exposure.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

Figure 1:
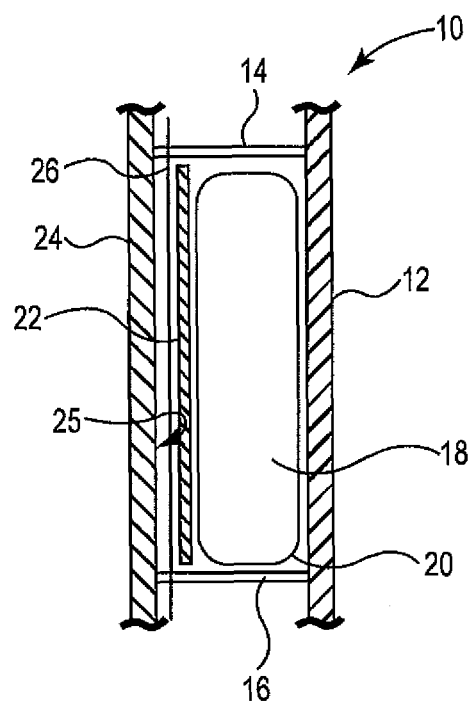
FIG. 1 is a cross-sectional view of a portion of an aircraft showing an aircraft fuselage with an embodiment of the graphite sheet material according to the present invention positioned between an insulation bag and the interior trim panel.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

For purposes of the present invention, a fire barrier system in an aircraft is a composite or laminate construction comprising flexible graphite sheet that is installed in interior surfaces of an aircraft to provide fire barrier protection in the event of fire either inside or outside of the fuselage of the aircraft. Preferably, the flexible graphite sheet is installed in the majority of the surface area corresponding to the inner surface of the outer shell of the aircraft. More preferably, the flexible graphite sheet is installed on at least 95% of the surface area corresponding to the inner surface of the outer shell of the aircraft. For purposes of the present invention an aircraft is any craft designed to fly in the air, including commercial aircraft and small airplanes, dirigibles, space aircraft for reentry in the earth's atmosphere (such as the space shuttle), and the like.

A flexible graphite sheet is continuous film of graphite. Preferably the flexible graphite sheet has a weight of from about 20 to about 250 g/m$^2$, preferably about 50 to about 70 g/m$^2$. Preferably, the flexible graphitized polymer sheet has a thickness of from about 5 to about 60 μm, more preferably 10 to about 50 μm and most preferably 15 to about 40 μm. The graphite sheet preferably has an MIT folding endurance of 1000 times or more, more preferably 10000 times or more. In this regard, a graphitized polymer sheet can be preferably used due to its low weight and the thin thickness.

Preferably, the flexible graphite sheet has an electrical conductivity of at least about 10000, preferably at least about 1.2×10$^4$ S/cm.

The flexible graphite sheet may be prepared from any appropriate process, such as by preparation from natural graphite, or more preferably by graphitizing a polymer film.

A natural graphite sheet is a sheet formed from compressed graphite particles. The natural graphite sheet is usually a sheet of compressed particles, wherein at least some of the particles are intercalated, exfoliated, expanded natural graphite. Among many kinds of natural graphite sheet, present inventors have found that a specific natural graphite sheet shows excellent fire barrier properties. It has been found that a natural graphite sheet formed from compressed graphite particles comprising unexfoliated, expandable graphite is disadvantageous in that its surface after being exposed to flame become seriously uneven and the sheet itself become foamed. That is, the natural graphite sheet comprising unexfoliated expandable graphite becomes a ragged sheet even by exposure to a single flame treatment. Therefore, this type of natural graphite sheet is not suitable for use in an aircraft, a ship or an offshore drilling platform which requires long term usage.

Therefore, in an embodiment of the present invention, the natural graphite sheet is a sheet of compressed particles, wherein the particles consist essentially of exfoliated, expanded natural graphite. In another embodiment of the present invention, the graphite sheet is substantially free of unexfoliated, expandable graphite. By "substantially free" it is meant that the film comprises at most only small amounts of exfoliated, expandable graphite in amounts that will not adversely affect the physical integrity of the sheet. In a preferred embodiment, the graphite sheet contains no unexfoliated, expandable graphite.

The present inventors have analyzed various natural graphite sheets and graphitized polymer sheets and found that generated gas derived from unexfoliated graphite particles during exposure to flame may cause such a problem as unevenness of the surface, degradation of strength of the sheet or insufficient flame retardancy. Based on this finding, the present inventors have found that thermal treatment of a natural graphite sheet formed from compressed graphite particles consisting essentially of exfoliated graphite particles can enhance fire barrier properties, especially of good appearance and sufficient strength after exposure to flame. The thermal treatment of the graphite sheet is preferably performed at high temperature to reduce impurities which are sources of gas, to decrease emissivity and to improve thermal conductivity. The temperature of this treatment is more than 700° C., preferably 1000° C., more preferably 2000° C. This thermal treatment can be performed under a halogen gas atmosphere, under an inert gas atmosphere or in vacuum. Among these, thermal treatment in vacuum is preferable in terms of improvement of strength of the graphite sheet and reduction of the amount of generated gas.

It is effective for enhancement of fire barrier properties of the graphite sheet to compress and/or roll the thus obtained graphite sheet. The graphite sheet is preferably compressed and/or rolled so as to contact a mirror plane of a compressive surface of compression equipment, preferably under elevated temperature. This process enables the graphite sheet to have low emissivity and sufficient strength. The graphite sheet having low emissivity shows excellent flame retardancy due to absorbing less heat. In addition to that, the compressing and/or rolling process also contributes to reduction of apparent impurities in the sheet. While not being bound by theory, it is believed that volatile impurities are released and dissipated from the sheet during the compression and/or rolling process, preferably under elevated temperature. It is further believed that impurities that do not volatilize under the conditions of compression and/or rolling are contained or blocked within the film.

The above-mentioned thermal treatment and compressing and/or rolling process may also be applied to a polymer graphitized sheet to enhance fire barrier properties. However, those processes are most effective for the natural graphite sheet formed from compressed graphite particles consisting essentially of exfoliated graphite particles in terms of improvement of thermal conductivity and reduction of emissivity, water absorption, gas permeability and amount of generated gas.

The amount of the carbon monoxide gas generated from the graphite sheet thus prepared is preferably under 5.0 E+16 molecules CO/mg of graphite sheet, more preferably under 7.0 E+15 molecules CO/mg of graphite sheet, most preferably under 2.0 E+15 molecules CO/mg of graphite sheet. The amount of the carbon dioxide gas generated from the graphite sheet thus prepared is preferably under 7.0 E+15 molecules $CO_2$/mg of graphite sheet, more preferably under 3.0 E+15 molecules $CO_2$/mg of graphite sheet, most preferably under 1.0 E+15 molecules $CO_2$/mg of graphite sheet. The generated gas can be measured by 3D-MASS, for example, Temperature-Programmed Desorption analyzer produced by Denshi Kagaku Kabushikikaisya. In this measurement, the gas generated during elevating the temperature from room temperature to 1200° C. at the temperature rising speed of 60° C./min and maintaining 1200° C. for 10 minutes is measured.

Emissivity of the graphite sheet thus prepared is preferably under 0.45, more preferably under 0.40, most preferably under 0.35.

In the present invention, fire barrier properties are provided by improved thermal conductivity of a graphite sheet, which is a different solution from thermal insulation by expanding and foaming the sheet itself. As such, the graphite sheet including natural graphite sheet and graphitized polymer sheet used in this invention can keep good appearance and strength during burning.

Therefore, the natural graphite sheet used in an embodiment of the present invention must consist essentially of exfoliated, expanded natural graphite. In this regards, although the particle may comprise unexfoliated, expandable graphite particles, the amount of unexfoliated, expandable particles should be low to avoid adverse effects to the fire barrier properties of the sheet due to the presence of deleterious amounts of unexfoliated, expandable particles. In another embodiment, the graphite sheet or graphitized sheet is substantially free of unexfoliated, expandable graphite. In a preferred embodiment, the graphite sheet or graphitized sheet contains no unexfoliated, expandable graphite.

Optionally, the natural graphite sheet may comprise a resin to assist in binding the particles together.

In a preferred embodiment, the flexible graphite sheet is prepared by heat treating in a polymer graphitization process. In this process, a polymer is heated to a high temperature for a time sufficient to transform the polymer sheet into a flexible graphite sheet. Advantageously, the graphitized polymer sheet does not utilize sulfuric acid in the production process, as compared to the manufacturing process in preparation of natural graphite sheets. Some of the problems arising from materials made using sulfuric acid include that hazardous outgases are released when the sheet is exposed to heat or when moisture absorption occurs. Additionally, when metals come into contact with the natural graphite sheet, the metals experience a much faster rate of corrosion as compared to graphite sheets made by the polymer graphitization process.

In an embodiment of the present invention, the polymer used as the starting material for subsequent transformation into a graphite film is selected from the group consisting of polyoxadiazoles, polybenzothiazole, polybenzobisthiazole, polybenzoxazole, polybenzobisoxazole, various kinds of polyimides, various kinds of polyamides, polyphenylenebenzoimidazole, polythiazole, polyparaphenylenevinylene, poly (p-phenyleneisophthalamide), poly(m-phenylenebenzoimidazole), and poly(phenylenebenzobisimidazole).

In a more preferred embodiment, the flexible graphite sheet is prepared by heat treating a polyimide film in a polymer graphitization process.

The process of polymer graphitization will now be discussed in more detail, first by discussing the preparation of the preferred polyimide film starting material.

The preferred polyimide film to be used in the invention can be produced by publicly known methods as disclosed, for example, in "Journal of Polymer Science: part A vol. 3, pp. 1373-1390 (1965)." Namely, it can be obtained by casting or applying a polyamic acid onto a substrate, followed by chemical or thermal imidization. Chemical imidization is preferred from the viewpoints of the toughness, breaking strength and productivity of the film.

As the polyamic acid serving as the precursor of the polyimide to be used in the invention, use can be fundamentally made of any known polyamic acid. The polyamic acid to be used in the invention is produced usually by dissolving at least one aromatic acid dianhydride and at least one diamine in a substantially equimolar amount of an organic solvent and stirring, under controlled temperature conditions, the thus obtained solution of the polyamic acid in the organic solvent until the polymerization of the acid dianhydride and the diamine is completed.

The polyimide is obtained by imidizing the polyamic acid. The imidization may be performed either by the heat cure method or by the chemical cure method. In the heat cure method, the imidization reaction proceeds under heating without resort to any dehydrocyclization agent. In the chemical cure method, on the other hand, the organic solvent solution of the polyamic acid is treated with a chemical converting agent typified by an acid anhydride such as acetic anhydride (a dehydrating agent) and a catalyst typified by a tertiary amine such as isoquinoline, β-picoline or pyridine. It is also possible to employ the chemical cure method together with the heat cure method. The imidization conditions may vary depending on, for example, the type of the polyamic acid, the film thickness and the cure method selected (i.e., the heat cure method and/or the chemical cure method).

Next, materials employed in the polyamic acid composition serving as the polyimide precursor according to the invention will be described.

Examples of the acid anhydride appropriately usable in the polyimide of the invention include pyromellitic acid dianhydride, 2,3,6,7-naphthalenetetracarboxylic acid dianhydride, 3,3',4,4'-biphenyltetracraboxylic acid dianhydride, 1,2,5,6-naphthalenetetracarboxylic acid dianhydride, 2,2',1,3,31'-biphenyltetracarboxylic acid dianhydride, 3,3',4,4'-benzophenonetetracarboxylic acid dianhydride, 2,2-bis(3,4-dicarboxyphenyl) propane dianhydride, 3,4,9,10-perylenetetracarboxylic acid dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic acid dianhydride, bis(3,4-dicarboxyphenyl) sulfone dianhydride, p-phenylenebis (trimellitic acid monoester acid anhydride), ethylenebis(trimellitic acid monoester acid anhydride), bisphenol A bis(trimellitic acid monoester acid anhydride) and analogs thereof.

Examples of the diamines appropriately usable in the polyimide composition of the invention include 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenyl ether, 3,3'-diaminodiphenyl ether, 3,41-di-aminodiphenyl ether, 1,5-diaminonaphthalene, 4,4'-diaminodiphenyldiethylsilane, 4,4'-diaminodiphenylsilane, 4,4'-diaminodiphenylethylphosphine oxide, 4,4,-diaminodiphenyl N-methylamine, 4,4,-diaminodiphenyl N-phenylamine, 1,4-diaminobenzene (p-phenylenediamine), 1,3-diaminobenzene, 1,2-diaminobenzene and analogs thereof.

Preferable examples of the solvent to be used in synthesizing the polyamic acid include amide type solvents such as N,N-dimethylformamide, N,N-dimethylacetamide and N-methyl-2-pyrrolidone. Among all, N,N-dimethylformamide is particularly preferable therefor.

In the case of performing the imidization by the chemical cure method, examples of the chemical converting agent to be added to the polyamic acid composition of the invention include aliphatic acid anhydrides, aromatic acid anhydrides, N,N'-dialkylcarbodiimides, lower aliphatic halides, halogenated lower aliphatic halides, halogenated lower fatty acid anhydrides, arylsulfonic acid dihalides, thionyl halides and mixtures of two or more thereof. Among these converting agents, it is preferable to use an aliphatic acid anhydride (for example, acetic anhydride, propionic anhydride, lactic anhydride) or a mixture of two or more thereof.

It is preferable that the chemical converting agent is used in an amount 1 to 10 times, more preferably 1 to 7 times and most preferably 1 to 5 times larger than the number of moles at the polyamic acid site in the polyamic acid solution.

To effectively carry out the imidization, it is preferable to add the chemical converting agent together with a catalyst. As the catalyst, use can be made of, for example, aliphatic tertiary amines, aromatic tertiary amines and heterocyclic tertiary amines. Among all, those selected from the heterocyclic tertiary amines are particularly preferable. That is, preferable examples of the catalyst include quinoline, isoquinoline, β-picoline and pyridine.

The catalyst is added in an amount of $1/20$ to 10 times, preferably {fraction $1/15$ to 5 times and more preferably $1/10$ to 2 times larger than the number of moles of the chemical converting agent.

When the chemical converting agent and the catalyst are used in insufficient amounts, the imidization cannot proceed effectively. When these additives are used in amounts that are too high, on the contrary, the imidization proceeds quickly thereby deteriorating the handling properties.

The polyamic acid solution thus obtained usually contains from 10 to 30% by weight of the polyamic acid in terms of solid matter. When the concentration thereof falls within this range, an appropriate molecular weight and an appropriate solution viscosity can be obtained.

Now, the chemical cure method will be described in detail. The polyamic acid composition above is mixed with a chemical converting agent and a catalyst is added. Then the resultant mixture is cast onto a casting face to give a film. Next, it is generally heated to, for example, about 80 to about 100° C. so that the chemical converting agent and the catalyst are activated and the cast film is converted onto a polyamic acid/ polyimide gel film (hereinafter referred to as the gel film). Heating duration is determined according to the thickness. Preferably, it is heated for about 30 seconds to about 10 minutes.

Subsequently, the gel film thus obtained is heated thereby removing moisture and the remaining solvent and chemical converting agent and simultaneously converting the polyamic acid into polyimide.

It is preferable, for example, in the continuous process that the gel film is held at both ends with tender clips or pins in the entering step.

To dry and imidate the film, it is preferable that the film is heated gradually and continuously and a high temperature is employed within a short period of time in the final heating stage, as commonly performed in the art. More particularly speaking, it is preferable to heat the film to 400 to 550° C. for 15 to 500 seconds in the final stage. When the final heating is performed at a higher temperature or for a longer time, there arises a problem of the heat deterioration of the film. When the final heating is performed at a lower temperature or for a shorter time, on the contrary, no desired effect can be established.

Next, the method for obtaining a polyimide film by applying a solution of a compound to a partly cured or partly dried polyamic acid film or polyimide film, or immersing the film in the solution, followed by drying by heating will be illustrated.

The partly cured or partly dried polyamic acid film or polyimide film (hereinafter referred to as the gel film) can be produced by a publicly known method. Namely, the polyamic acid is cast or applied onto a substrate followed by heat imidization.

Alternatively, a chemical converting agent and a catalyst are mixed with the polyamic acid solution and then the resultant solution is cast onto a substrate to give a film. Next, the chemical converting agent and the catalyst are activated by heating to about 100° C. Thus a gel film having been cured to such an extent as having self-supporting properties can be obtained.

The gel film is in the course of curing from the polyamic acid into the polyimide and has self-supporting properties. Its residual volatile content, which is calculated in accordance with the following formula 1, ranges from 5 to 500%, preferably from 5 to 100% and more preferably from 5 to 50%. It is appropriate to use a film having the residual volatile content falling within the range as defined above. When the residual volatile content is outside of this range, the desired effects are difficult to achieve.

$$(A-B) \times 100/B \qquad \text{Formula 1:}$$

wherein A represents the weight of the gel film; and B represents the weight of the gel film after heating to 450° C. for 20 minutes.

The imidization rate, which is calculated in accordance with the following formula 2 with the use of infrared absorption spectrometry, of the film is 50% or more, preferably 80% or more, yet more preferably 85% or more, and 90% or more in the most desirable case. It is appropriate to use a film having the imidization rate falling within the range as defined above. When the imidization rate is outside of this range, the desired effects are difficult to achieve.

$$(C/D) \times 100/(E/F) \qquad \text{Formula 2:}$$

wherein C represents the absorption peak height of the gel film at 1370 cm-1; D represents the absorption peak height of the gel film at 1500 cm-1; E represents the absorption peak height of the polyimide film at 1370 cm-1; and F represents the absorption peak height of the gel film at 1500 cm-1.

In the graphitization process of the polymer film of the present invention, the polymer film, which is a starting material, is subjected to preheat treatment under reduced pressure or in nitrogen gas to perform carbonization. The preheating is usually carried out at about 500° C. The maximum temperature in this process is about 800° C. to 1500° C. Preferably, the film is retained for about 30 minutes to about an hour in a temperature range form about 500° C. to 1500° C. and the temperature is raised at a rate of 10° C./min.

Subsequently, the carbonized film is set in a very high temperature oven to perform graphitization. The graphitization is performed in an inert gas. As the inert gas, argon or helium is suitable, and addition of a small amount of helium to argon is more preferable. The heat treatment temperature required is preferably at least 2,000° C. at the minimum, and heat treatment is finally performed preferably at a temperature of 2,400° C. or higher, and more preferably 2,600° C. or higher.

As the heat treatment temperature is increased, transformation into a quality graphite is more easily enabled. However, in view of economics, preferably, transformation into a quality graphite is enabled at temperatures as low as possible. In order to achieve a very high temperature of 2,500° C. or higher, usually, a current is directly applied to a graphite heater and heating is performed using the resulting Joule heat. Deterioration of the graphite heater advances at 2,700° C. or higher. At 2,800° C., the deterioration rate increases about tenfold, and at 2,900° C., the deterioration rate increases further about tenfold. Consequently, it brings about a large economical advantage to decrease the temperature at which transformation into a quality graphite is enabled, for example, from 2,800° C. to 2,700° C., by improving the polymer film as the starting material.

As described above, post-thermal treatment of the thus obtained graphite sheet can be performed. Compressing and/ or rolling processes can also performed to enhance the fire barrier properties of the sheet.

The graphite sheets exhibit good fire barrier effects in burn-through tests. Fire barrier evaluation can be carried out by a method described in Aircraft Materials Fire Test Handbook by Federal Aviation Administration Fire Safety (FAA), Chapter 24—Test Method To Determine the Burn-through Resistance of Thermal/Acoustic Insulation Materials (Federal Register/Vol. 68, No. 147/Thursday, Jul. 31, 2003/Rules and Regulations). The present inventors have found that a high fire barrier effect can be achieved by use of the flexible graphitized polymer sheet. The flexible graphitized polymer sheet makes it possible that flame does not penetrate even after 6 minutes in the above-described test.

The graphite sheets also exhibit good fire barrier effects in a picture frame test. Evaluation through a picture frame test is carried out as in the burn-through test, except that each sheet is affixed on a 31.75 inch×17.75 inch frame. Thermographic measurement can be conducted with a thermograph, TH71-707 produced by NEC/San-Ei Instruments, Ltd. In an embodiment of the present invention, the graphitized polymer sheet exhibits a heat flux of 3.4 W/cm$^2$ (3.0 BTU/ft2·s) or less 6 minutes after start of the test and a temperature of 300° C. (527 F) or less 6 minutes after start of the test in a picture frame test.

In an embodiment of the present invention, the graphitized polymer sheet also exhibits a heat flux of 8.0 W/cm$^2$ or less at the back side of the graphite sheet 6 minutes after start of the test in a picture frame test.

Furthermore, in an embodiment of the present invention, the graphitized polymer sheet exhibits a temperature of 800° C. or less at the back side of the graphite sheet 6 minutes after start of the test in a picture frame test.

The graphitized polymer sheet preferably has a thermal conductivity in the plane direction of 300 W/mK or more, preferably 1000 W/mK or more; a thermal conductivity in the thickness direction of 1 to 20 W/mK; and the ratio of the thermal conductivity in the plane direction to the thermal conductivity in the thickness direction of 20 or more.

Thermal conductivity of graphitized polymer sheets have been evaluated before pressing and after pressing. "Before pressing" refers to a graphite sheet in a state after the polyimide is carbonized and graphitized but before pressing. In this state, air is borne between graphite layers and the heat insulation effect is high. The present inventors have studied the temperatures of the surfaces of the graphite sheet and conventional fire barrier product and found that the graphite sheets have a higher frame barrier effect than conventional commercially available product such as Nextel. Furthermore, heat is diffused faster in the graphitized polymer sheets among the graphite. Due to this reason, the temperature at the back side of the graphitized polymer sheets from the flame is lowest among the graphite.

Formation of heat spots can be prevented more easily with graphite sheets than with other fire barrier product among the graphite, graphitized polymer sheets more easily prevent heat spots than natural graphite sheets and decrease the probability of burning a combustible located at the opposite side of the sheet. Consequently, the heat flux of the graphite sheets is lower, and, among the graphite sheets, the graphitized polymer sheets (polyimide graphite sheets) have a lower heat flux.

The present inventors have also confirmed that the graphite sheets have an electromagnetic shielding property in addition to the fire barrier property. According to the results of measurement of electromagnetic shielding effects, the graphite sheets have an electromagnetic shielding effect comparable to that of copper foils. The same effect was also confirmed with the graphitized polymer sheets. This property is useful for a protective material for use in airplanes. Although fuselages of airplanes are typically composed of aluminum and the like material, there exist some airplanes with fuselages composed of organic materials (carbon fiber reinforced plastic or CFRP). In the cases where aluminum is used, a problem does not arise because aluminum has an effect of shielding electromagnetic waves from outside. In the cases where an organic material is used, it is a current practice to embed metal meshes and the like therein to shield electromagnetic waves. Since the graphite sheets also have electromagnetic shielding effect, both the fire barrier effect and the electromagnetic shielding effect can be expected when the graphite sheets are used as a fire barrier material. Thus, the trouble of using metal meshes in the fuselages or the like can be avoided.

The electromagnetic shielding effect can be measured in accordance with a KEC method (1 to 18 GHz).

As described above, the graphite sheets have fire barrier effects superior to that of a commercially available product. Larger amounts of lower-molecular-weight compounds are contained in natural graphite. This has been found by comparison between natural graphite sheets and the graphitized polymer sheets among graphite sheets by 3D-MASS. Since the graphitized polymer sheets are substantially free of low-molecular-weight compounds, the graphitized polymer sheets emit less gas during heating or burning, are less hazardous to human bodies, and can thus be safely used as a fire barrier material for airplanes. Therefore, the gas permeability of the graphite sheet can be 100.0×10$^6$ cc/m$^2$·day or less.

The water absorption of the graphite sheet is preferably 1% or less.

The fire barrier system of the present invention may be provided in a number of configurations, and may be specially adapted for use in aircraft by selection of low weight materials and configurations. In an embodiment of the present invention, the system comprises a laminate construction to provide a reinforced graphite layer, or optionally for enclosing an insulation bag, the laminate comprising as one of the layers a flexible graphite sheet. The reinforcing layer of the laminate may, for example, consist of plastic layers. Examples of reinforcing layers include metallized polyester or nylon films and high temperature stable polymeric materials that are optionally metallized, such as polyamides, polyvinyl fluorides, silicone resins, polyimides, polytetrafluoroethylenes (PTFEs), polyesters, polyaryl sulfones, polyetheretherketones, polyester amides, polyester imides, polyethersulfones, polyphenylene sulfides and combinations thereof.

The plastic layer may be a commercially available heat-resistant plastic film. A fiber reinforced plastic layer can be used as a plastic layer. Epoxy resin and phenol resin as the plastic, fiberglass and Kevlar as the fiber can be used in such a layer. Carbon fiber reinforced plastic layers also can be used as a plastic layer. Epoxy resin as the plastic, carbon fiber as the fiber can be used in such a layer.

The laminate may comprise insulative paper such as NOMEX paper.

The laminate may also comprise an inorganic fiber layer. The inorganic fiber layer means an array of fibers that may be randomly or regularly distributed, or may be in the form of a woven or a non-woven textile or a scrim of inorganic fiber such as fiberglass, ceramic fibers, metal fibers and mineral fibers. Alumina fibers, zirconia boron fibers, titanium oxide fibers, silicon carbide fibers can be used as Ceramic fibers. Rock wool and a basalt fiber can be used as the mineral fiber.

The laminate may also comprise an organic fiber layer. The organic fiber layer means a woven or a non-woven or a scrim of the organic heat-resistant fibers such as Nomex or Kevlar.

The scrim is included to provide tear resistant properties and puncture resistance to the laminate sheet material. The average thickness of the scrim can vary. The layer of scrim is preferably lightweight, strong, and at least relatively non-flammable. Preferably, the scrim generates little or no smoke, or combustible or toxic decomposition products when exposed to flame.

Suitable non-metallic fibers include, but are not limited to, nylon, polyester, fiberglass, glass fibers, aramid fibers, crystalline ceramic oxide (including quartz) fibers, silicon nitride fibers, silicon carbide fibers, oxidized polyacrylonitrile fibers, carbon fibers, and combinations thereof. The fibers are typically provided as individual fibers or as bundled fibers, varying in length from a few centimeters to several meters. Preferably, the non-metallic fibers are glass fibers, crystalline ceramic oxide fibers, or combinations thereof. It is understood that crystalline ceramic oxide fibers may contain minor amounts of glassy phases at the grain boundaries. More preferably, the second substrate comprises primarily ceramic oxide fibers.

The laminate may also comprise a layer of metal sheet such as aluminum sheet and SUS including thin metal foil.

The fire barrier system may optionally be provided an insulation blanket comprising as one layer of the insulation blanket a flexible graphite sheet. The blanket may comprise one or more polymer film layers, one or more woven or non-woven scrim layers and one or more foam layers. Examples of foam materials include polyurethane foam, polyisocyanurate foam, and silicon foam. A specific type of fire barrier system presently contemplated is a laminar construction comprising a layer of sound insulative foam and a fire barrier layer that is a flexible graphite sheet.

The graphite sheet can be provided in self-adhesive construction for application to substrates, e.g. fuselage or to insulation construction. In this embodiment, the graphite sheet may be provided as sheet with pressure sensitive adhesive ("psa") coated thereon, optionally with a release liner covering the psa. When application to the intended substrate is desired, the user removes the release liner from the psa, thereby exposing the adhesive and making the self-adhesive graphite sheet ready for application to the substrate.

Preferably the adhesives used throughout all constructions are flame-retardant adhesives. The term flame-retardant adhesive material as used herein typically refers to an adhesive material that contains a flame-retardant additive(s) in a sufficient amount such that the adhesive material will not support combustion. Representative examples of such additives include, but are not limited to, antimony compounds, hydrated alumina compounds, ammines, borates, carbonates, bicarbonates, inorganic halides, phosphates, sulfates, organic halogens and organic phosphates. A continuous or discontinuous layer of flame-retardant adhesive material may be used to bond layers within the laminate sheet material, such as the first layer to the second layer. Preferably, a continuous layer of adhesive material is used for uniformity reasons.

In another embodiment of the present invention, the fire barrier system is a fire resistant repair patch for aircraft cargo bay liners comprises a base member consisting of at least one inner sheet of woven fiberglass with outer layers of flexible graphite sheet. A quantity of self curing resin having a flame retardant additive is also supplied in two-component form. The components of the resin are mixed together and then applied to the periphery of one side of the base member. The base member is then pressed into place over the damaged area on the bay liner. In order to retain the base member in place, strips of fire retardant adhesive tape are applied over the base member and affixed to the bay liner. The base member is then reinforced with a fiberglass scrim as necessary. Techniques for application of the fire resistant repair patch will now be apparent to the skilled artisan, as shown, for example, in U.S. Pat. No. 5,705,006 or U.S. Pat. No. 5,424,105, which are incorporated by reference for all purposes.

Turning to the drawing, FIG. 1 is a cross sectional and expanded side view of a portion of an aircraft 10. Positioned against outer fuselage skin 12 and between frames 14 and 16 is insulation bag 18. Insulation bag 18 comprises an insulation material such as fiberglass (not shown) encased within a fluid barrier cover 20. A purpose of fluid barrier cover 20 is to protect the fiberglass insulation from condensation and other fluids it may come into contact with. Examples of materials suitable for use as a fluid barrier cover 20 include metallized polyester or nylon films and high temperature stable polymeric materials that are optionally metallized, such as polyamides, polyvinyl fluorides, silicone resins, polyimides, polytetrafluoroethylenes (PTFEs), polyesters, polyaryl sulfones, polyetheretherketones, polyester amides, polyester imides, polyethersulfones, polyphenylene sulfides and combinations thereof.

Graphite sheet 22 according to the present invention is positioned on the side of insulation bag 18 opposite outer fuselage skin 12, adjacent to interior trim panel 24 and interposed between insulation bag 18 and electrical wiring 26. Graphite sheet 22 is advantageously located as shown such that in the event of a fire from an electrical short circuit, graphite sheet 22 preferably prevents spread of fire to flammable metallized polyester cover 20 of insulation bag 18 from which it could potentially spread throughout the rest of the aircraft. Graphite sheet 22 may optionally be affixed to a surface of insulation bag 18. Alternately, graphite sheet 22 may optionally be affixed to interior trim panel 24 and electrical wiring 26, thereby partially encasing electrical wiring 26 within an enclosure defined by graphite sheet 22 and interior trim panel 24. In another embodiment (not shown), graphite sheet 22 may optionally be affixed to the external surface 25 of the interior trim panel 24 without encasing electrical wiring 26. In an embodiment of the invention, graphite sheet 22 is affixed to a surface by a temperature resistant adhesive (not shown). In a preferred embodiment of the present invention, graphite sheet 22 is affixed to substantially the entire external surface 25 of interior trim panel 24, thereby providing continuous protection of the internal portion of the aircraft from fire sources that are external to the passenger and/or cargo compartment of the aircraft, including both fires originating in electrical wiring of the aircraft and fire sources that are external to the fuselage skin 12.

Figure 2:
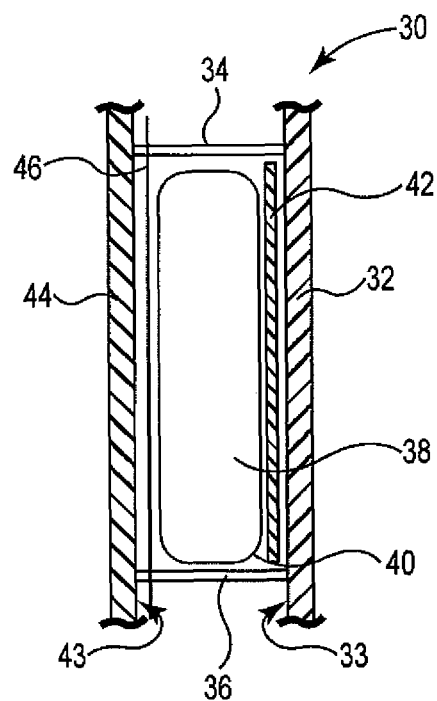
FIG. 2 is a cross-sectional view of a portion of an aircraft showing an aircraft fuselage with an embodiment of the graphite sheet material according to the present invention positioned between an insulation bag and the outer fuselage skin.

FIG. 2 is a cross sectional and expanded side view of a portion of an aircraft 30. Positioned against outer fuselage skin 32 and between frames 34 and 36 is insulation bag 88. Insulation bag 18 comprises fiberglass insulation (not shown) encased within metallized polyester cover 40. A purpose of metallized polyester cover 40 is to protect the fiberglass insulation from condensation and other fluids it may come into contact with. Graphite sheet 42 according to the present invention is positioned on the side of insulation bag 38 opposite interior trim panel 44 and adjacent to outer fuselage skin 32. In this embodiment, graphite sheet 42 is advantageously located as shown such that in the event of a fire starting from outside of aircraft outer fuselage skin 32, graphite sheet 42 preferably prevents spread of fire to flammable metallized polyester cover 40 of insulation bag 48 from which it could potentially spread throughout the rest of the aircraft. Graphite sheet 42 may optionally be affixed to a surface of insulation bag 38. Alternately, graphite sheet 42 may optionally be affixed to the inners surface 33 of outer fuselage skin 32. In an embodiment of the invention, graphite sheet 42 is affixed to a surface by a temperature resistant adhesive (not shown). In a preferred embodiment of the present invention, graphite sheet 42 is affixed to substantially the entire inner surface 33 of outer fuselage skin 32, thereby providing continuous protection of the internal portion of the aircraft from external fire sources. In another embodiment, a first graphite sheet 42 is positioned on the side of insulation bag 38 opposite interior trim panel 44 and adjacent to outer fuselage skin 32, and a second graphite sheet (not shown) is positioned on the side of insulation bag 38 opposite outer fuselage skin 32, adjacent to interior trim panel 44.

Figure 3:
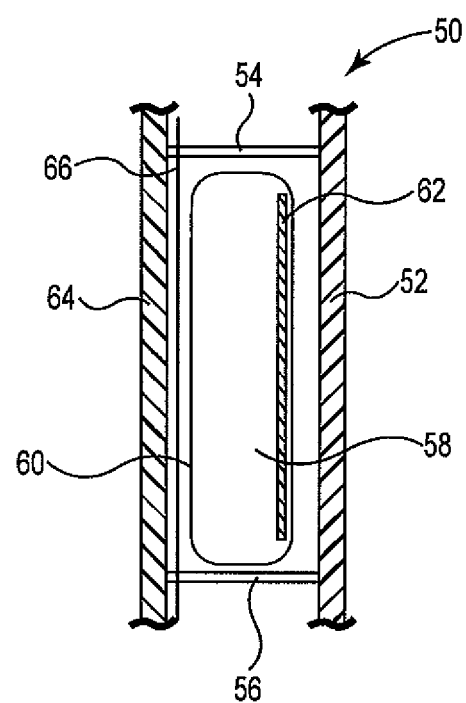
FIG. 3 is a cross-sectional view of a portion of an aircraft showing an aircraft fuselage with an embodiment of the graphite sheet material according to the present invention positioned inside an insulation bag.

FIG. 3 is a cross sectional and expanded side view of a portion of an aircraft 50. Positioned against outer fuselage skin 52 and between frames 54 and 56 is insulation bag 58. Insulation bag 58 comprises fiberglass insulation (not shown) encased within metallized polyester cover 60. A purpose of metallized polyester cover 60 is to protect the fiberglass insulation from condensation and other fluids it may come into contact with. Graphite sheet 62 according to the present invention is positioned on the inside of insulation bag 58 on the side adjacent outer fuselage skin 52. Graphite sheet 62 preferably prevents spread of fire from a source of fire external to the aircraft fuselage skin 52 to the contents of insulation bag 58, from which it could potentially spread throughout the rest of the aircraft. Likewise, another embodiment provides graphite sheet 62 according to the present invention being positioned on the inside of insulation bag 58 on the side adjacent interior trim panel 64 and electrical wiring 66. In this embodiment (not shown) graphite sheet 62 preferably prevents spread of fire from a source of fire from the interior of the aircraft to the contents of insulation bag 58, from which it could potentially spread throughout the rest of the aircraft. In an alternative embodiment of the present invention, graphite sheet 62 may be positioned or affixed to the entire inside surface of insulation bag 58. When the graphite sheet 62 is affixed to a surface of insulation bag 58, preferably a temperature resistant adhesive is used.

The above embodiments describe an insulation strategy that primarily addresses concerns regarding external noise and temperature, as would be experienced in larger aircraft. Certain aircraft raise different insulation concerns that address structural noise rather than external noise. This is particularly the case in smaller aircraft, and therefore a noise dampening effect is particularly desired in this application that can be more effectively provided by foam-based insulation. The present invention is also useful in the insulation configurations used in such smaller aircraft.

Figure 4:
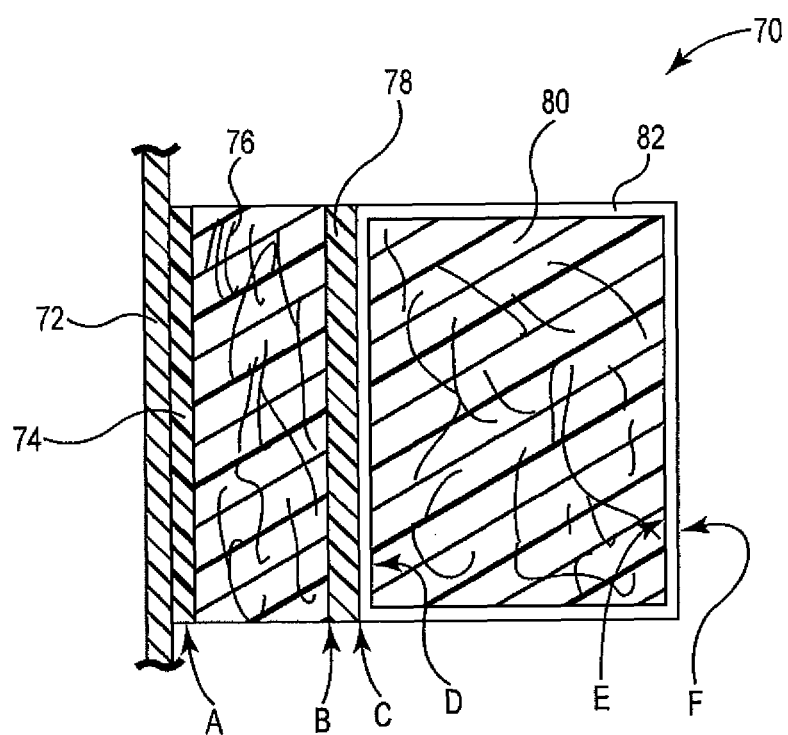
FIG. 4 is a cross-sectional view of a portion of an aircraft showing an aircraft fuselage with an embodiment of the graphite sheet material according to the present invention positioned at various locations relative to a foam insulation construction.

FIG. 4 is an illustration of this embodiment, showing a cross sectional side view of a portion of an aircraft 70. Outer fuselage skin 72 has graphite sheet 74 positioned adjacent thereto. In an embodiment of the present invention, graphite sheet 74 is adhered to outer fuselage skin 72 by an adhesive that preferably is a temperature resistant adhesive (not shown). Foam layer 76 is provided as a dampening for structure-borne noise. Examples of materials useful for making foam layer 76 include polyurethane foam, polyisocyanurate foam, and silicon foam. Foam layer 76 preferably is provided at a thickness of less than about 0.5 inches.

Aluminum foil layer 78 is positioned adjacent to foam layer 76, and provides enhanced flammability protection. Optionally, the aluminum foil layer 78 has a thickness of about 5-20 mils, and preferably about 10 mils.

Additional foam layer 80 is positioned adjacent to aluminum foil layer 78, and provides additional sound and temperature insulation properties. Examples of materials useful for making additional foam layer 80 include polyimide foams, such as SOLIMIDE® polyimide insulation foams from Evonik Foams, Inc., Allen, Tex. Preferably, the additional foam layer 80 are from about one to two inches (25.4-50.8 mm) thick having densities of about 0.3 pcf ($4.8 \text{ Kg/m}^3$) to about 0.6 pcf ($9.6 \text{ Kg/m}^3$).

Preferably, additional foam layer 80 is enclosed within a water resistant cover film 82 that provides protection against water absorption by additional foam layer 80.

Examples of water resistant cover film 82 include metallized polyester covers.

As shown, graphite sheet 74 is positioned at location A, between outer fuselage skin 72 and Foam layer 76. Alternative locations for graphite sheet 74 between one or more of the components of the portion of aircraft 70 are specifically contemplated. Thus, graphite sheet 74 may optionally be positioned at Location B (between foam layer 76 and aluminum foil layer 78), at Location C (between aluminum foil layer 78 and water resistant cover film 82), at Location D (between water resistant cover film 82 and additional foam layer 80 at the outboard side of this construction), at Location E (between additional foam layer 80 and water resistant cover film 82 at the inboard side of this construction), and/or at Location F (at the inboard side of water resistant cover film 82). In an embodiment of the present invention, it is contemplated that the entire additional foam layer 80 may be encapsulated by graphite sheet 74, either inside or outside of water resistant cover film 82.

A fire barrier wall is important for some structures. The fire hazard of material is often defined by their fire reaction and fire resistant properties. Fire reaction property is used to describe the flammability and combustion properties of material that affect the early stages of fire, generally from ignition to flashover. Fire reaction is also used to describe the smoke toxicity of a combustible material. Important fire reaction properties that affect fire growth are the heat release rate, time to ignition, flame spread time and oxygen index. Two other important fire reaction properties are smoke density and gas toxicity.

While many fire reaction properties are important in the development of fire up to the point of flashover, the fire resistant properties are critical when the fire has fully developed. Fire resistance defines the ability of a material or structure to impede the spread of fire and retain mechanical integrity. In other words, fire resistance relates to the ability of a construction to prevent a fire from spreading from one room to neighboring rooms. The main fire resistant properties are heat insulation, burn-through resistance, and structural integrity.

The conventional fire barrier protection such as a metal sheet has an advantage of fire reaction property, while it exhibits insufficient fire resistant property.

On the other hand, another conventional fire barrier protection such as FRP (fiber reinforced plastic) has an advantage of fire resistant property, while it exhibits insufficient fire reaction property.

Therefore, fire barrier protection products that exhibit excellent properties in both the fire reaction property and the fire resistant property have been demanded for various applications such as aircraft, ships and offshore drilling platforms.

The graphite sheet is useful for the fire barrier protection due to its superior properties as listed below.

1. Thinner
2. Flexible
3. Lighter weight
4. Excellent burn-through resistance
5. No water absorption
6. No outgas
7. Non corrosion The graphite sheet exhibits excellent fire reaction and fire resistant properties. In the conventional fire barrier protection system, CFRP, FRP and foam layers have been considered to have difficulty in use for ships, offshore and drilling platform due to its insufficient fire reaction property. The present invention enables the use of CFRP, FRP and foam layers for such the applications in combination with the graphite sheet. The laminate comprising the graphite sheet and CFRP, FRP and foam layers allows the laminate to exhibit excellent fire barrier property and trim its weight.

The graphite sheet is especially useful for fire barrier protection which is required to be light weight and small in size, such as in aircraft, ships, and offshore drilling platforms, due to above listed properties.

The use of a fire barrier system comprising a flexible graphite sheet and the various embodiments described herein individually to achieve fire barrier protection in an aircraft, a ship, and in an offshore drilling platform is additionally specifically contemplated.

EXAMPLES

Example 1

Test specimens were evaluated to determine the degree of fire barrier properties afforded in the form of sheets. Graphitized polyimide sheet (1 mil and 1.5 mil) and a sheet of NEXTEL 312 Flame Stopping Dot Paper from 3M Company were evaluated to determine their response to flame challenge. Graphitized polyimide sheet was prepared from a polyimide film obtained from 4,4'-diaminodiphenyl ether and pyromellitic acid dianhydride.

The specimens first were conditioned by holding the test specimens at 70+/−5 degree F. and 55%+/−10% relative humidity, for a minimum of 24 hours prior to testing. During the actual test, the test room is kept at 70+/−5 degree F. and 55%+/−10% relative humidity.

A flame assault was carried out under the following conditions:

A Bernz-O-matic TS-2000 torch was ignited, and the flame was set to a height of 2.5 inches, and allowed to reach a steady state.

A specimen of size 1.5 inch×2.5 inch was inserted into the flame, with its lower surface being 0.4 inches above the level of the top of the torch. The sample was held in this position for 6 minutes, with the observations as recorded in Table 1.

TABLE 1

| | Graphite sheet (1 mil and 1.5 mil) | Ceramic paper |
|---|---|---|
| <10 sec | No change | Ceramic paper became charred and have offensive odor |
| <30 sec. | No change | Charred is gone Flame started to penetrate the paper |
| 6 min | No change | Flame continued to penetrate the paper |
| After testing | Graphite sheet keeps flexibility | Ceramic paper does not flexibility |

Figure 5:
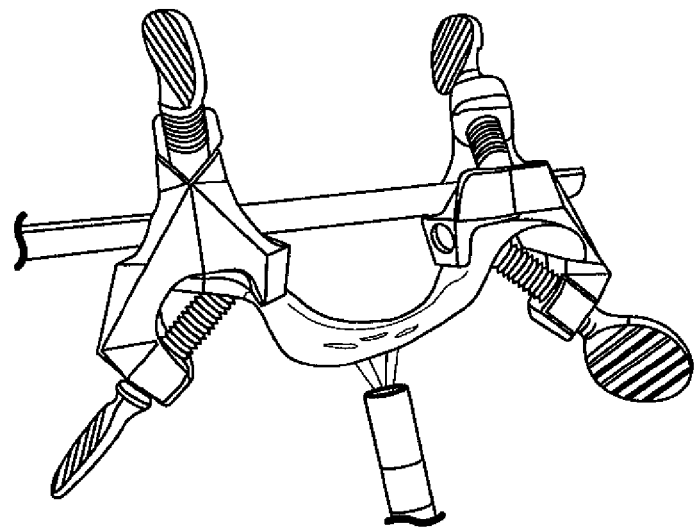
FIG. 5 is a drawing of a flame test showing flame barrier properties of a graphite sheet material according to the present invention.

As a result of the lab test, it was observed that the graphite sheet does not burn at all. It as also noted that flame does not penetrate the graphite sheet (neither 1 mil nor 1.5 mil graphite sheet). See FIG. 5.

In contrast, the ceramic paper became charred in a short time. This phenomenon seems to be due to burning of the binder resin of ceramic paper. Ceramic fiber itself does not burn. However, after the binder resin was apparently burned away, the flame was observed to penetrate the ceramic paper. After the completion of the burn test, the ceramic paper was observed to be brittle, while the graphite sheet remained flexible.

Example 2

An identical test was carried out comparing a graphitized polyimide sheet having a thickness of 40 μm with a sheet of natural graphite (240 μm). The observations for both graphite sheets were the same as above, except that after conclusion of the test it was noted that the natural graphite film formed a blister about 2-5 mm in a diameter on the surface of the sheet. However, flame was not observed to penetrate the natural graphite sheet. Graphitized polyimide sheet was prepared from a polyimide film obtained from 4,4'-diaminodiphenyl ether and pyromellitic acid dianhydride.

Example 3

Samples used in evaluation are shown in Table 2. A polyimide prepared by polymerization of pyromellitic acid dianhydride with 4,4'-diaminodiphenyl ether was used as PI graphite. Five types of graphite sheets that have different thicknesses and include natural graphite sheets, and a commercial product, Nextel 312 Flame Stopping Dot Paper from 3M Company were used.

Figure 6:
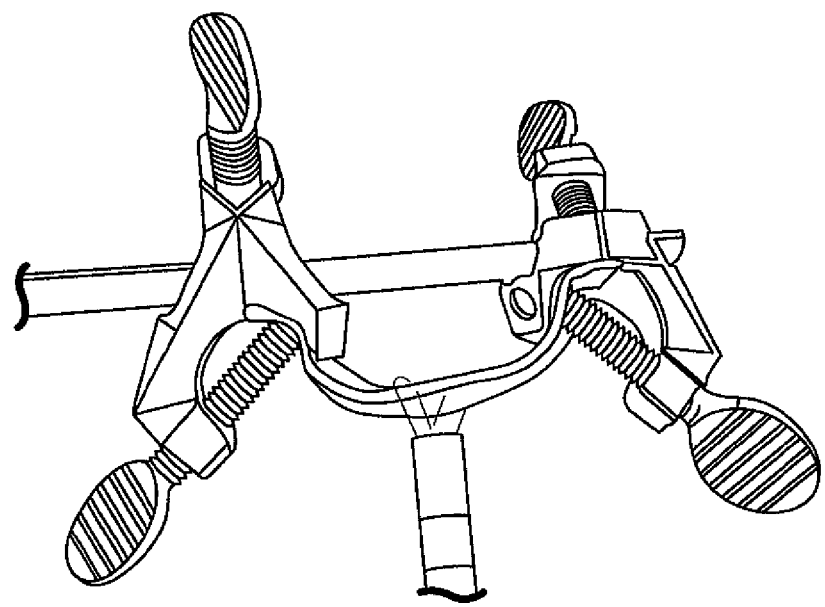
FIG. 6 is a drawing of a flame test showing flame barrier properties of a ceramic paper material according to the Prior Art.

Burn-through test was carried out by a method described in Aircraft Materials Fire Test Handbook by Federal Aviation Administration Fire Safety (FAA), Chapter 24—Test Method To Determine the Burnthrough Resistance of Thermal/Acoustic Insulation Materials (Federal Register/Vol. 68, No. 147/Thursday, Jul. 31, 2003/Rules and Regulations). See FIG. 6.

This figure shows that high fire barrier effect is achieved since flame does not penetrate even after 6 minutes.

Figure 7:
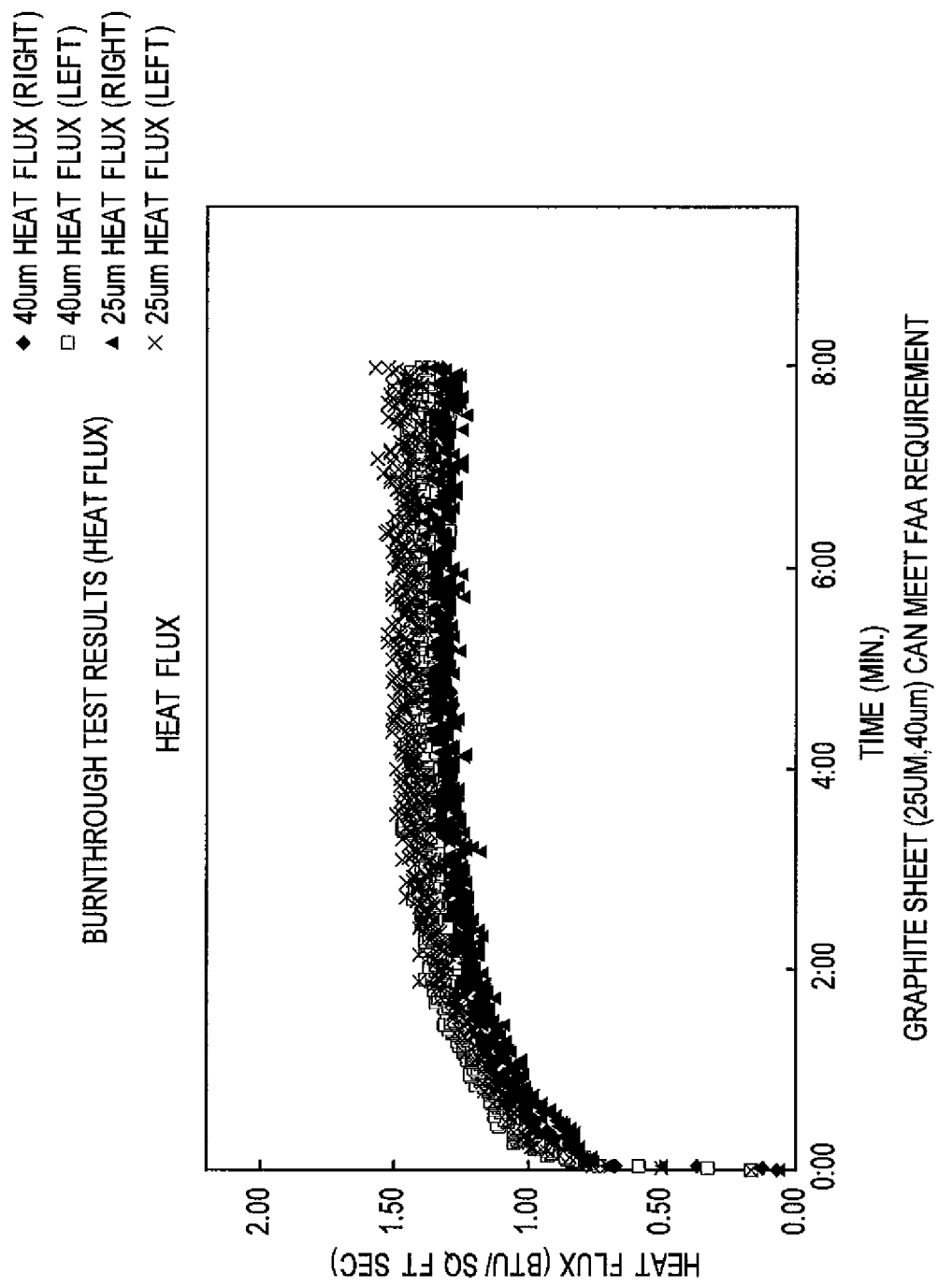
FIG. 7 is a result of a burn-through test showing Heat Flux.
Figure 8:
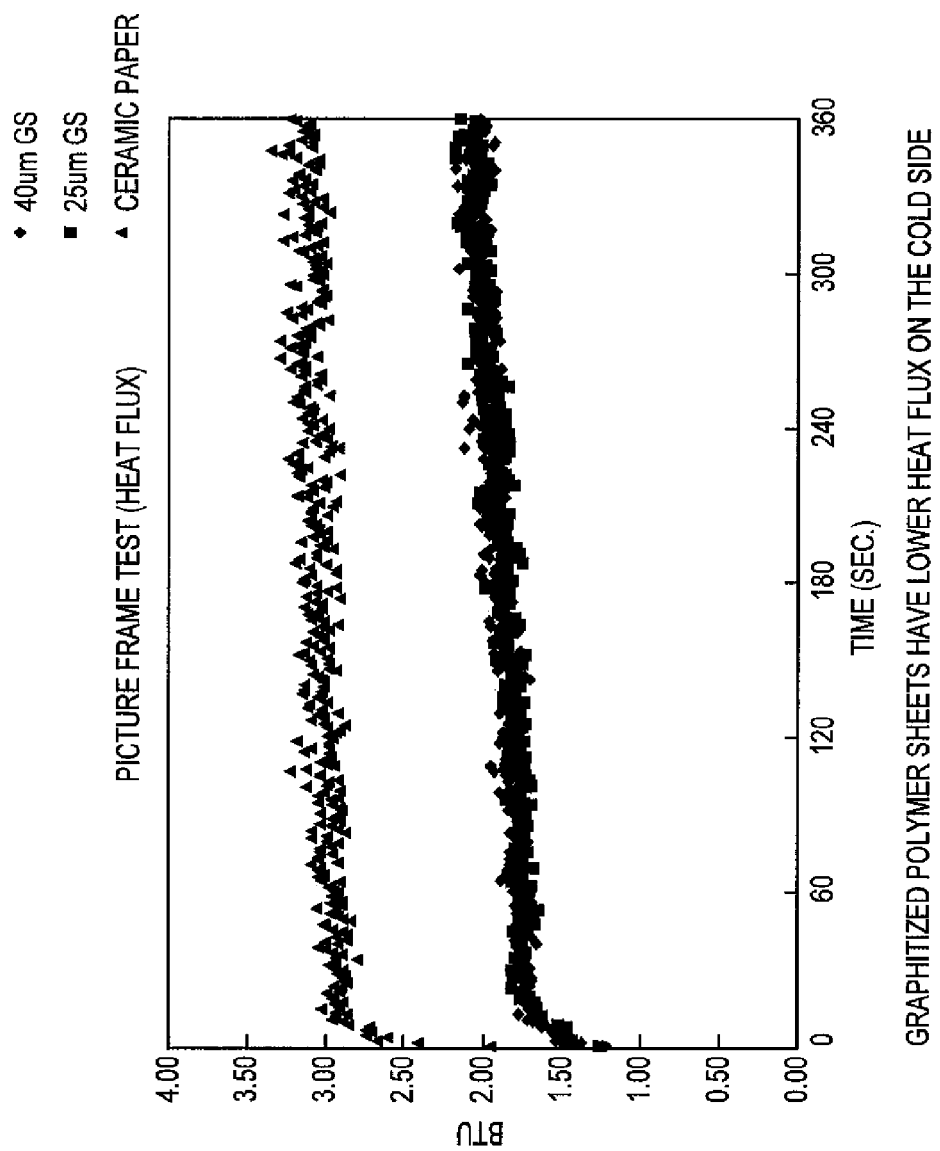
FIG. 8 is a result of a picture flame test showing Heat Flux.
Figure 9:
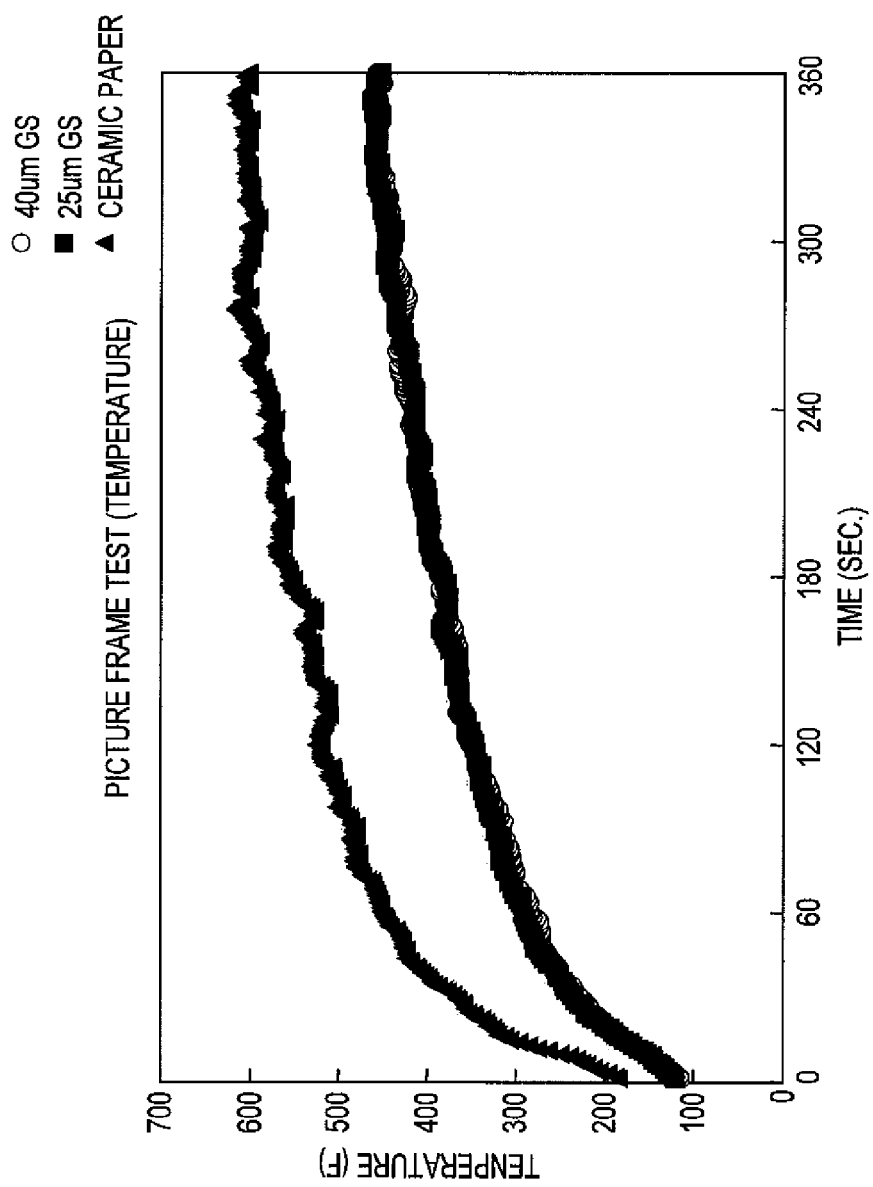
FIG. 9 is a result of a picture flame test showing the temperature.
Figure 10:
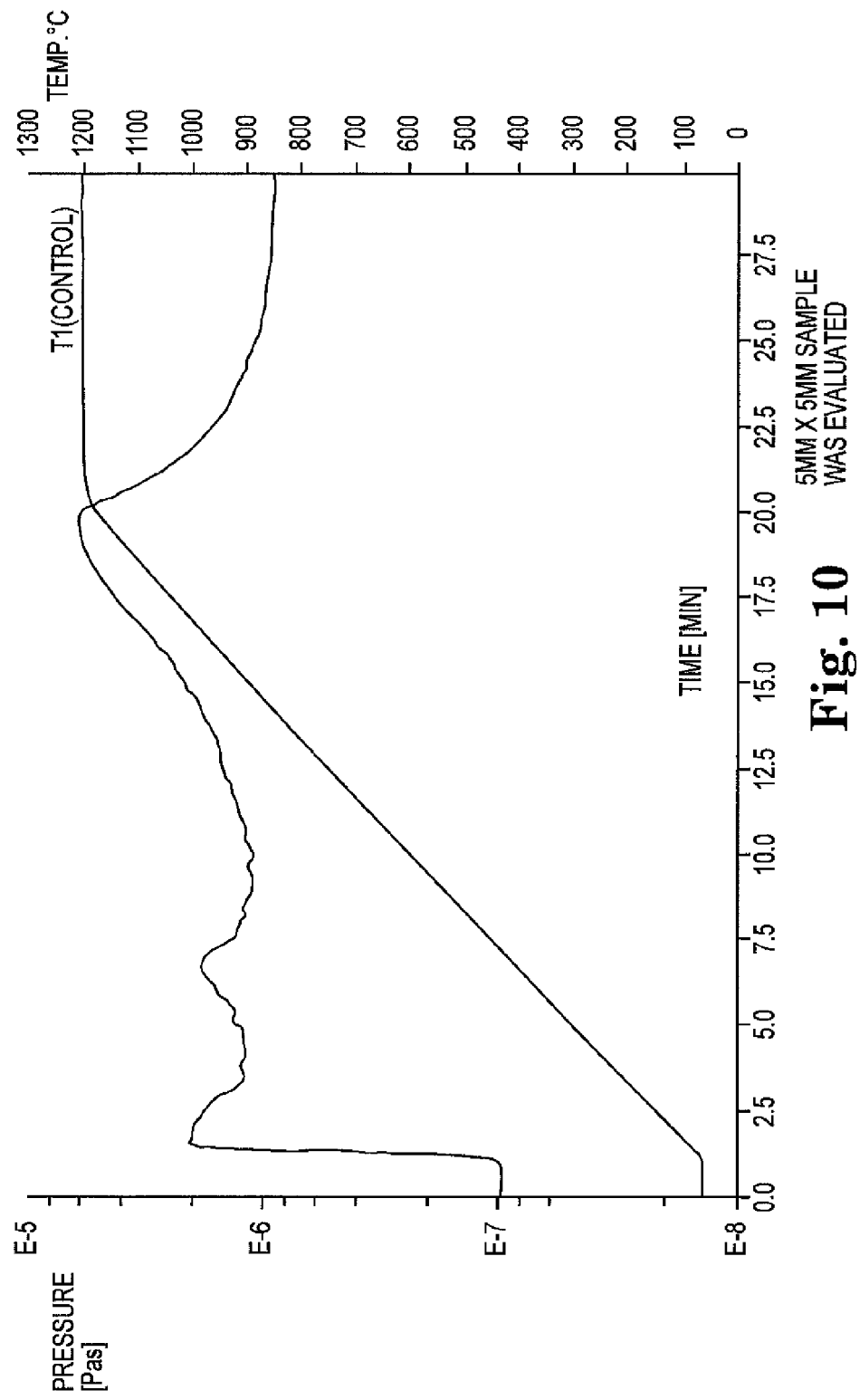
FIG. 10 shows pressure changes during vacuum annealing for a sheet of natural graphite.
Figure 11:
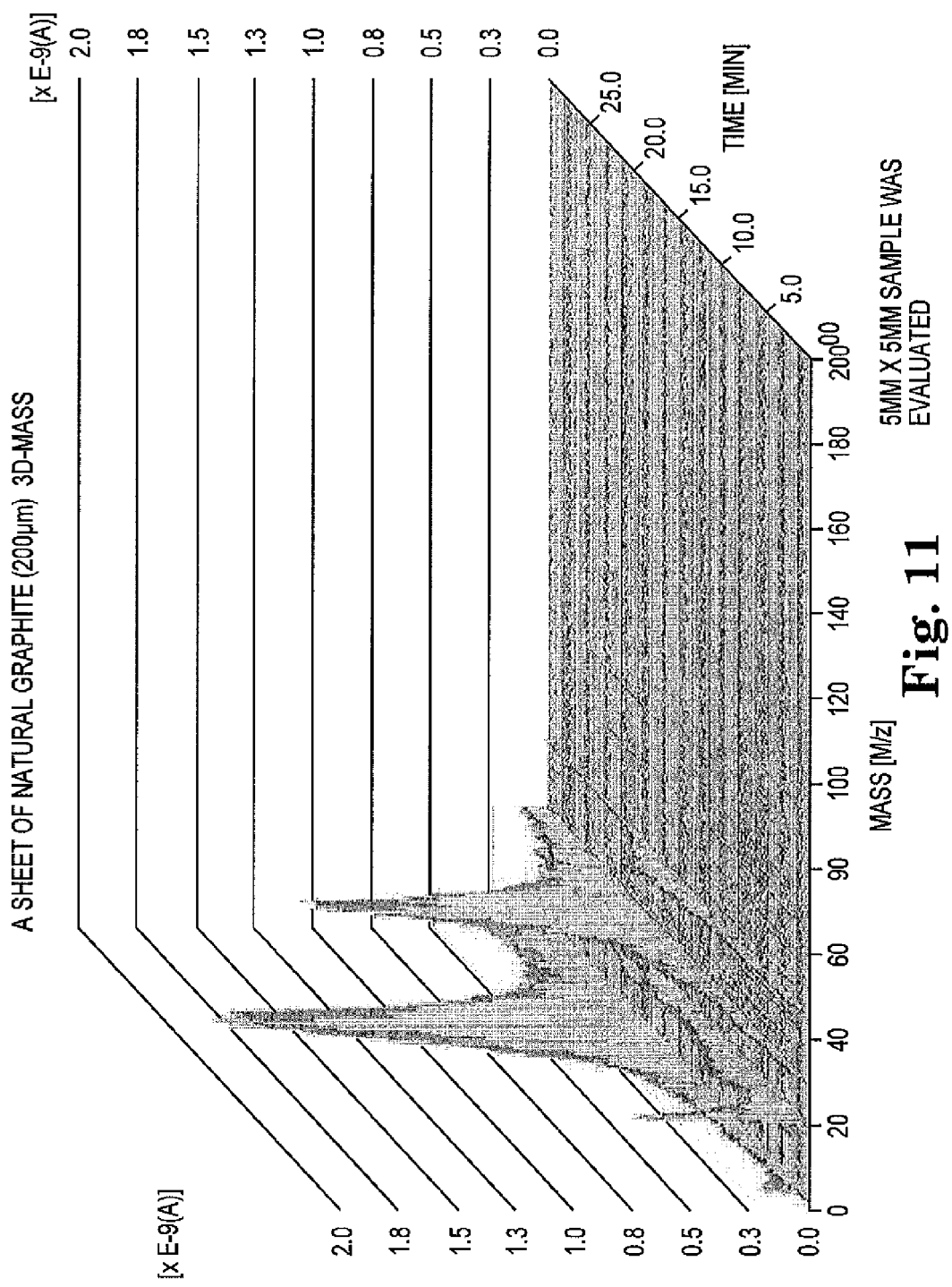
FIG. 11 and FIGS. 12A, 12B, 12C and 12D are results of 3d-MASS for a sheet of natural graphite.
Figure 12A:
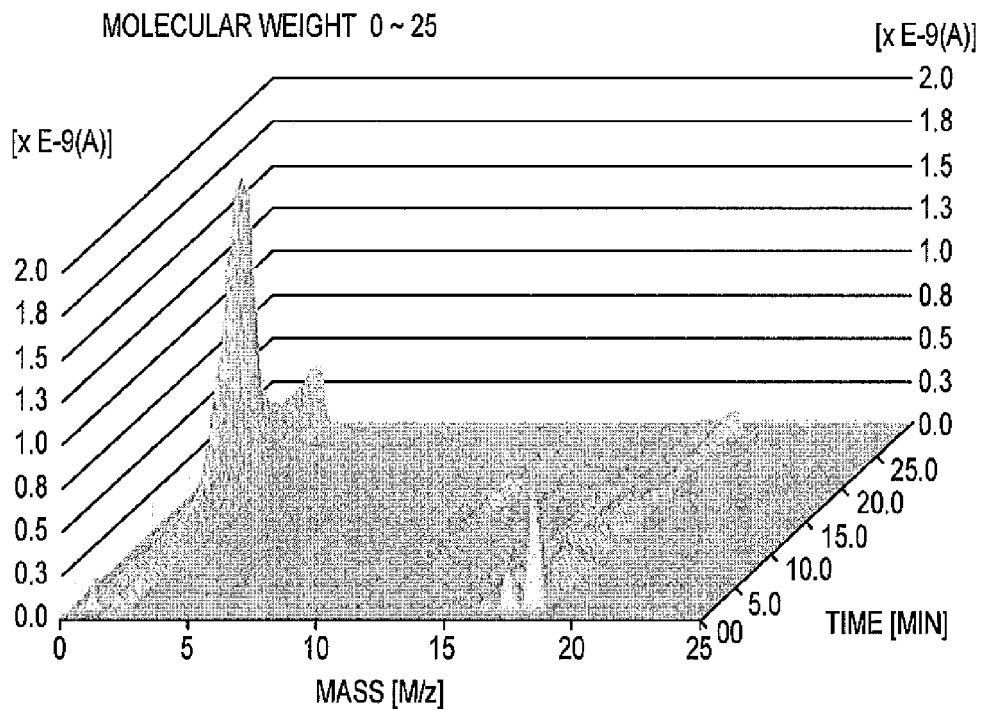
Figure 12B:
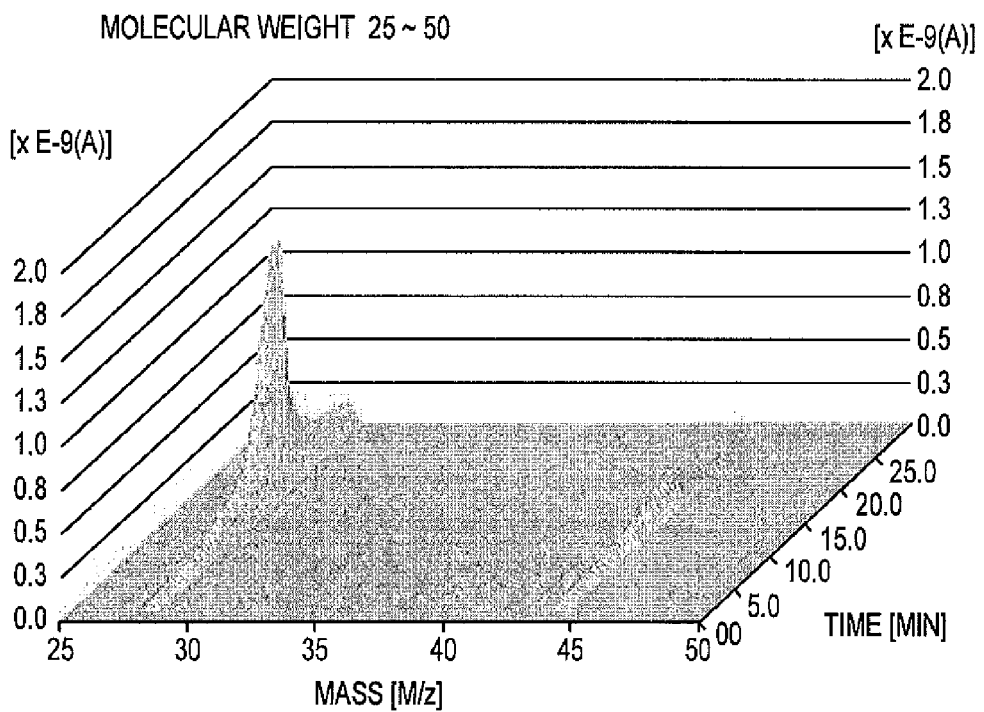
Figure 12C:
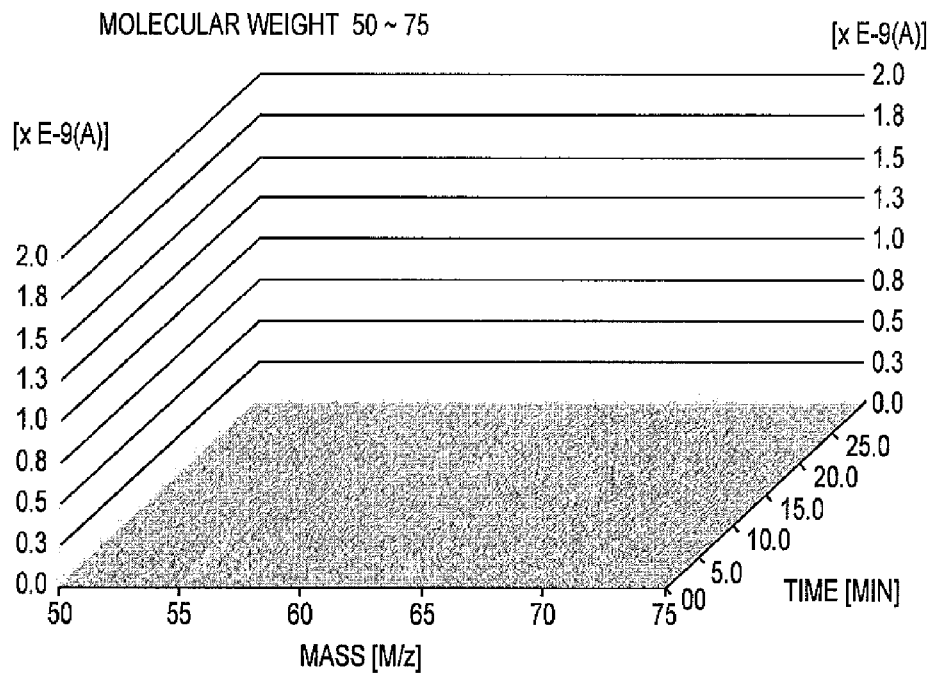
Figure 12D:
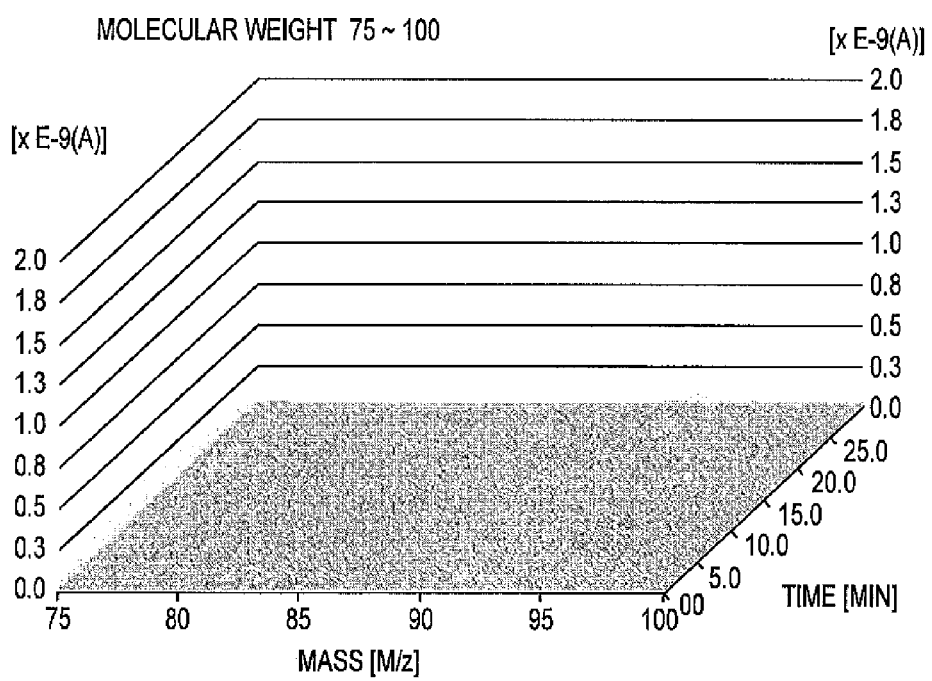
Figure 13:
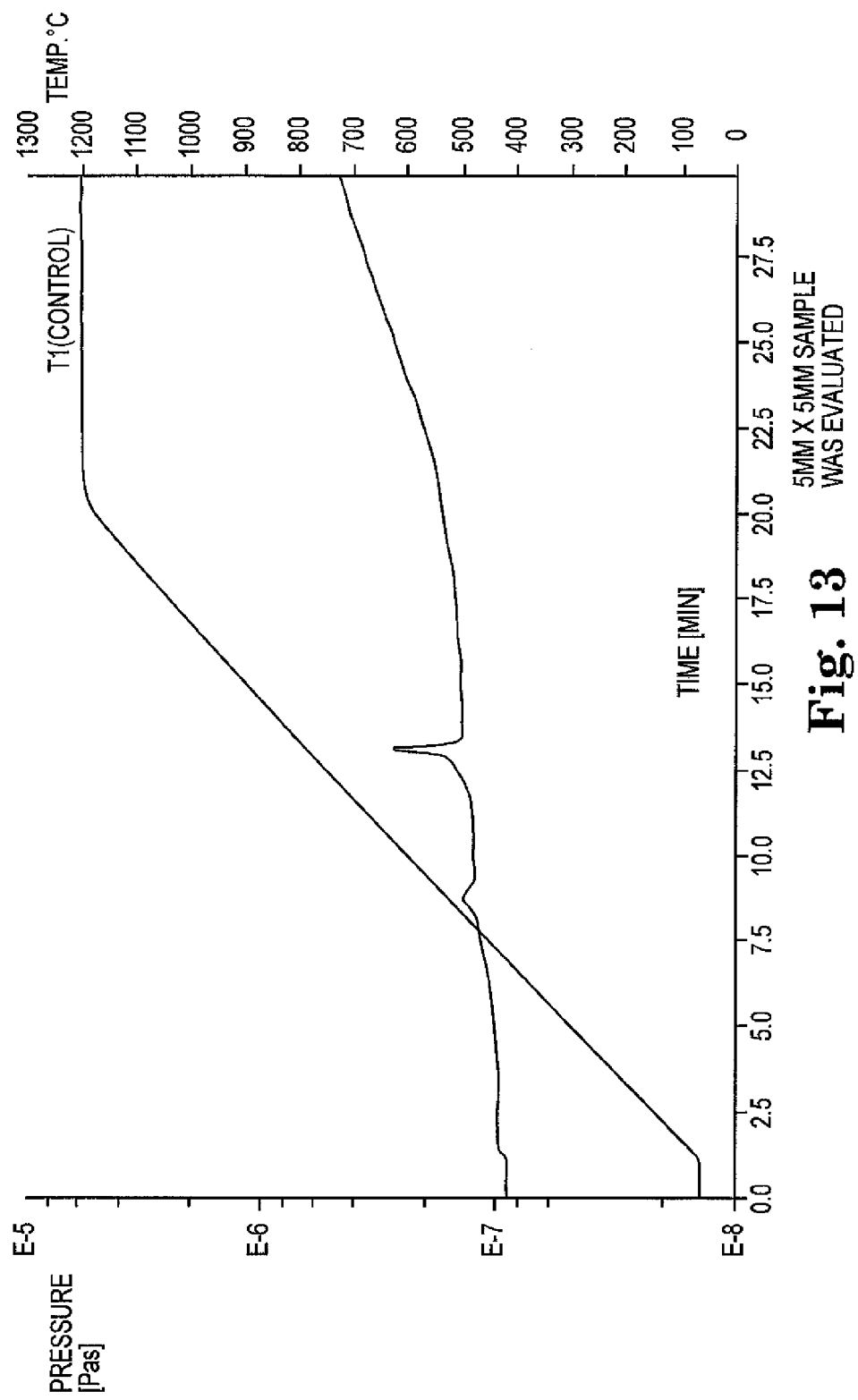
FIG. 13 shows pressure changes during vacuum annealing for graphitized polymer sheet.
Figure 14:
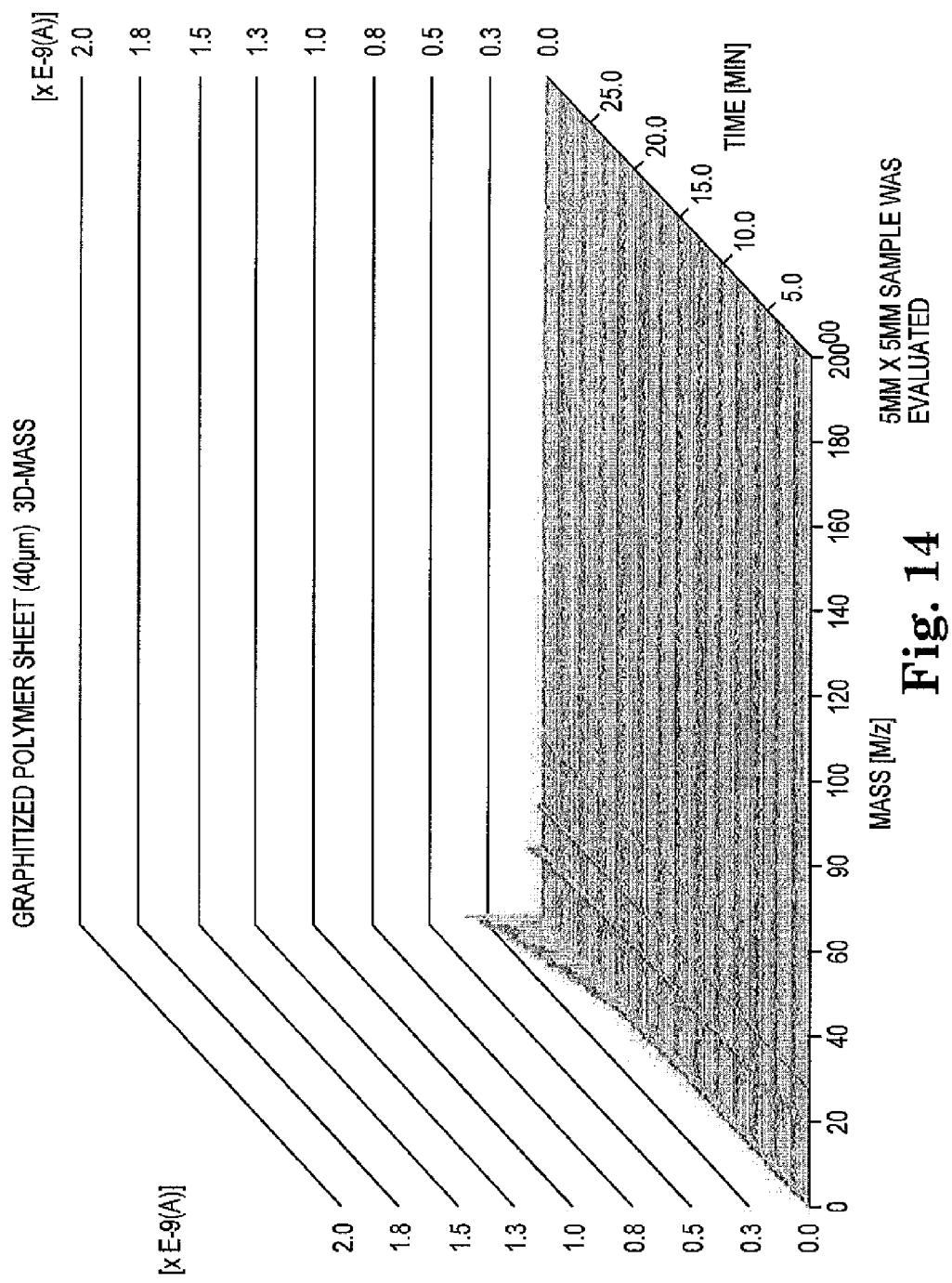
FIG. 14 and FIGS. 15A, 15B, 15C and 15D are results of 3d-MASS for graphitized polymer sheet.
Figure 15A:
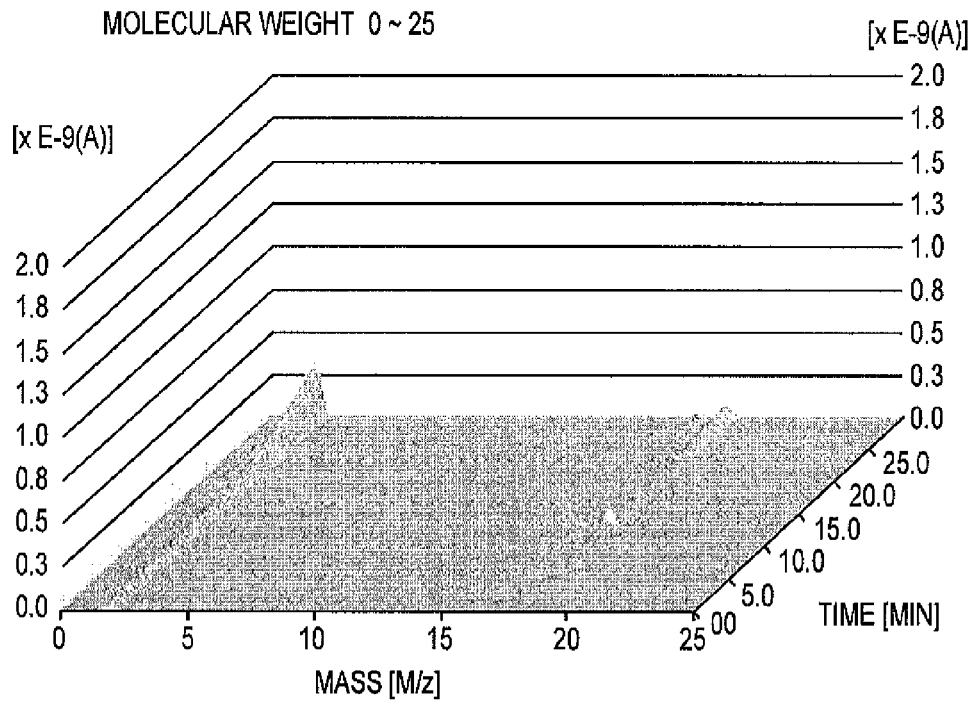
Figure 15B:
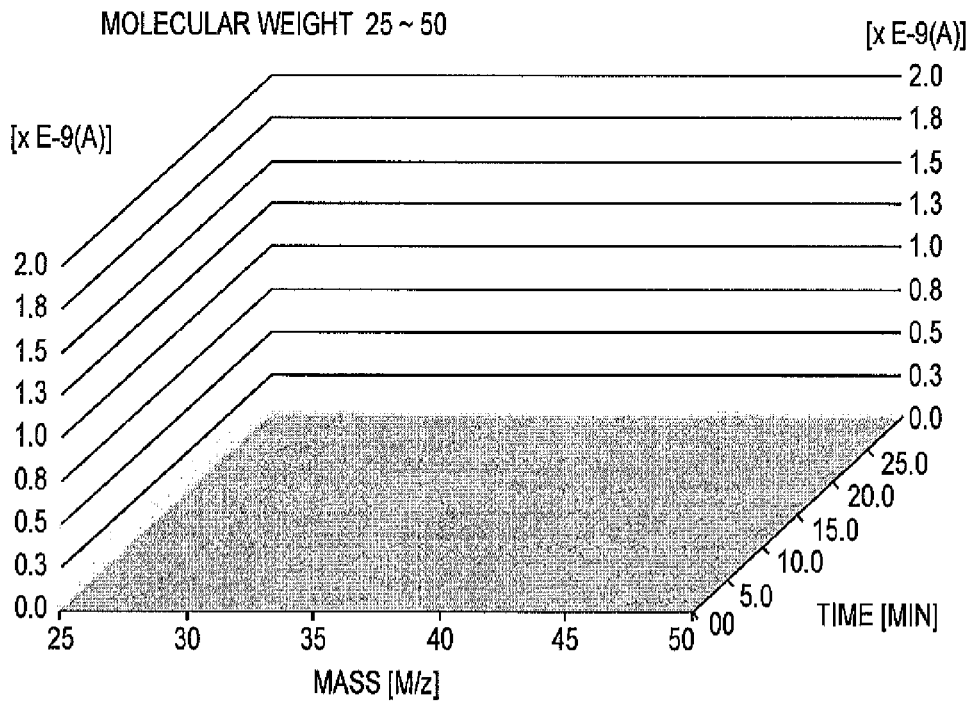
Figure 15C:
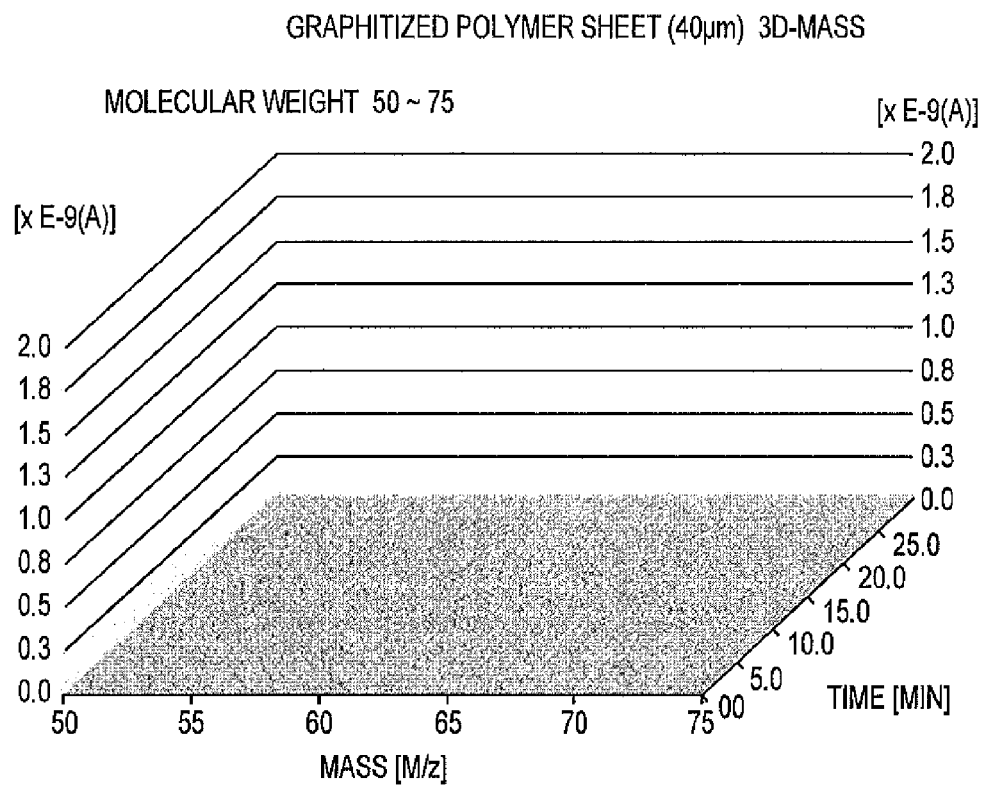
Figure 15D:
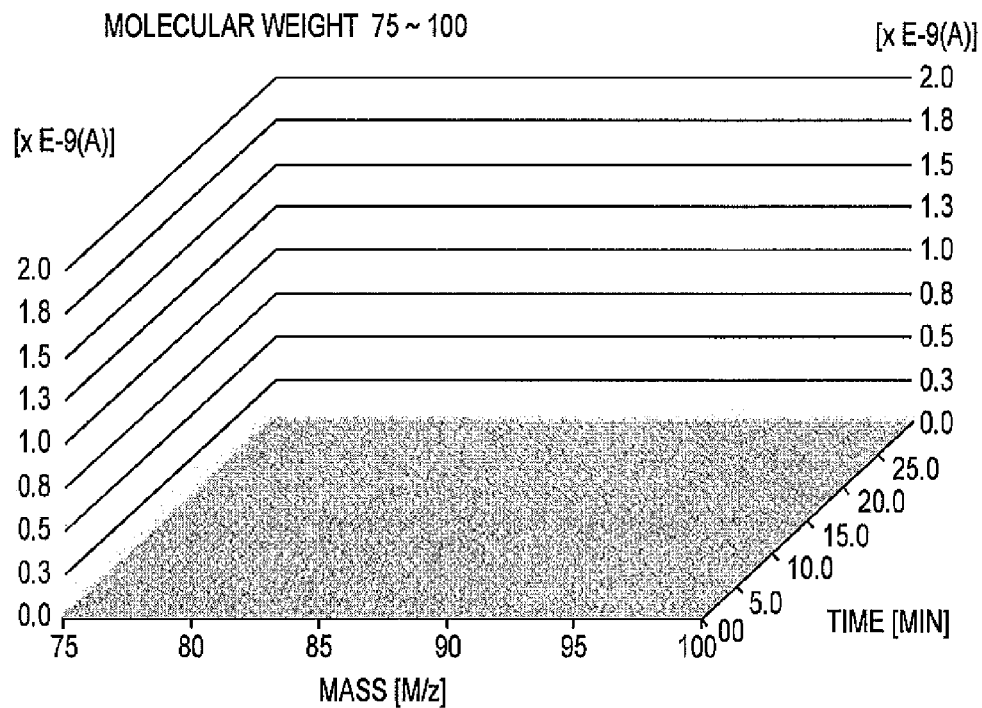
Figure 16:
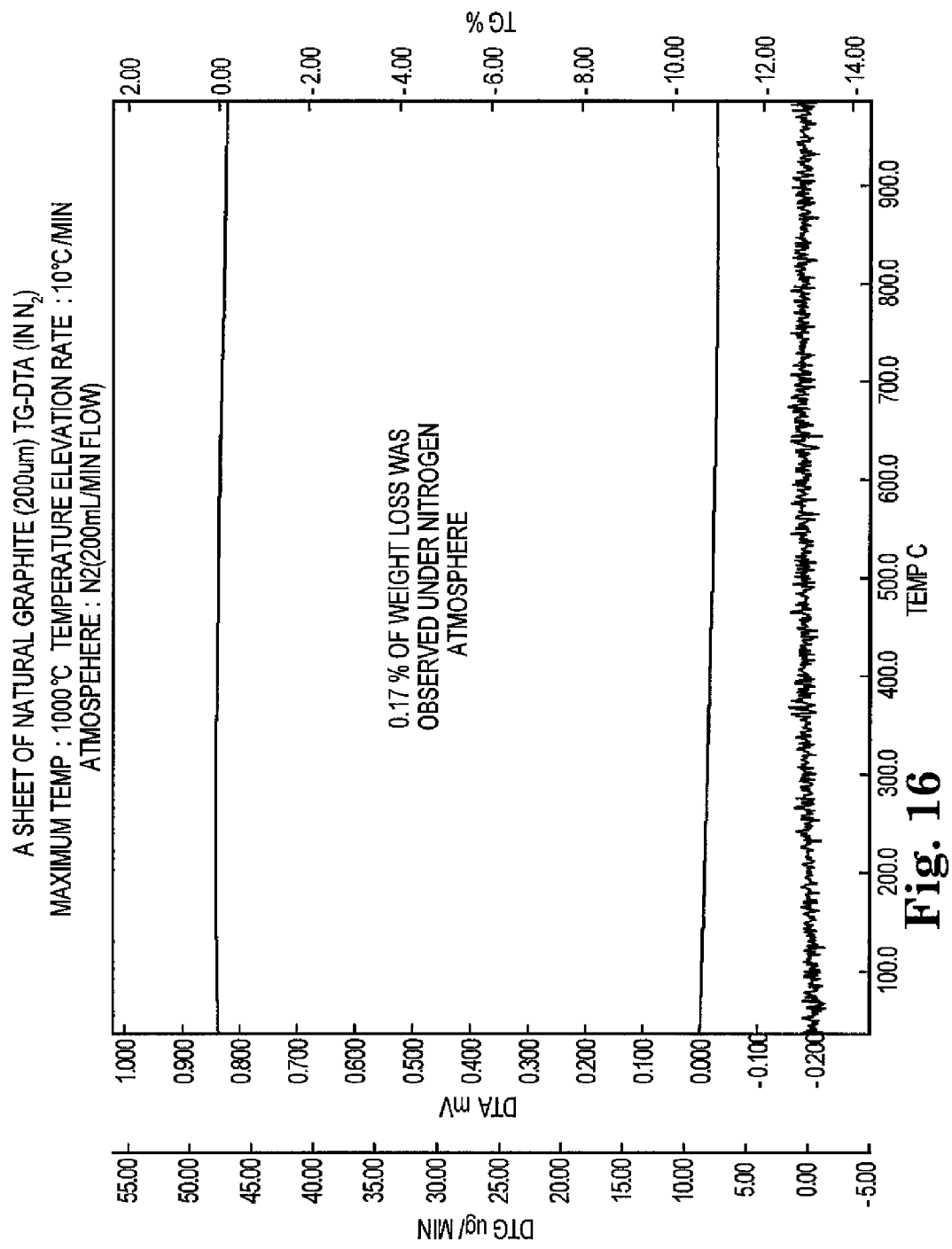
FIG. 16 is a result of TG analysis for a sheet of natural graphite.
Figure 17:
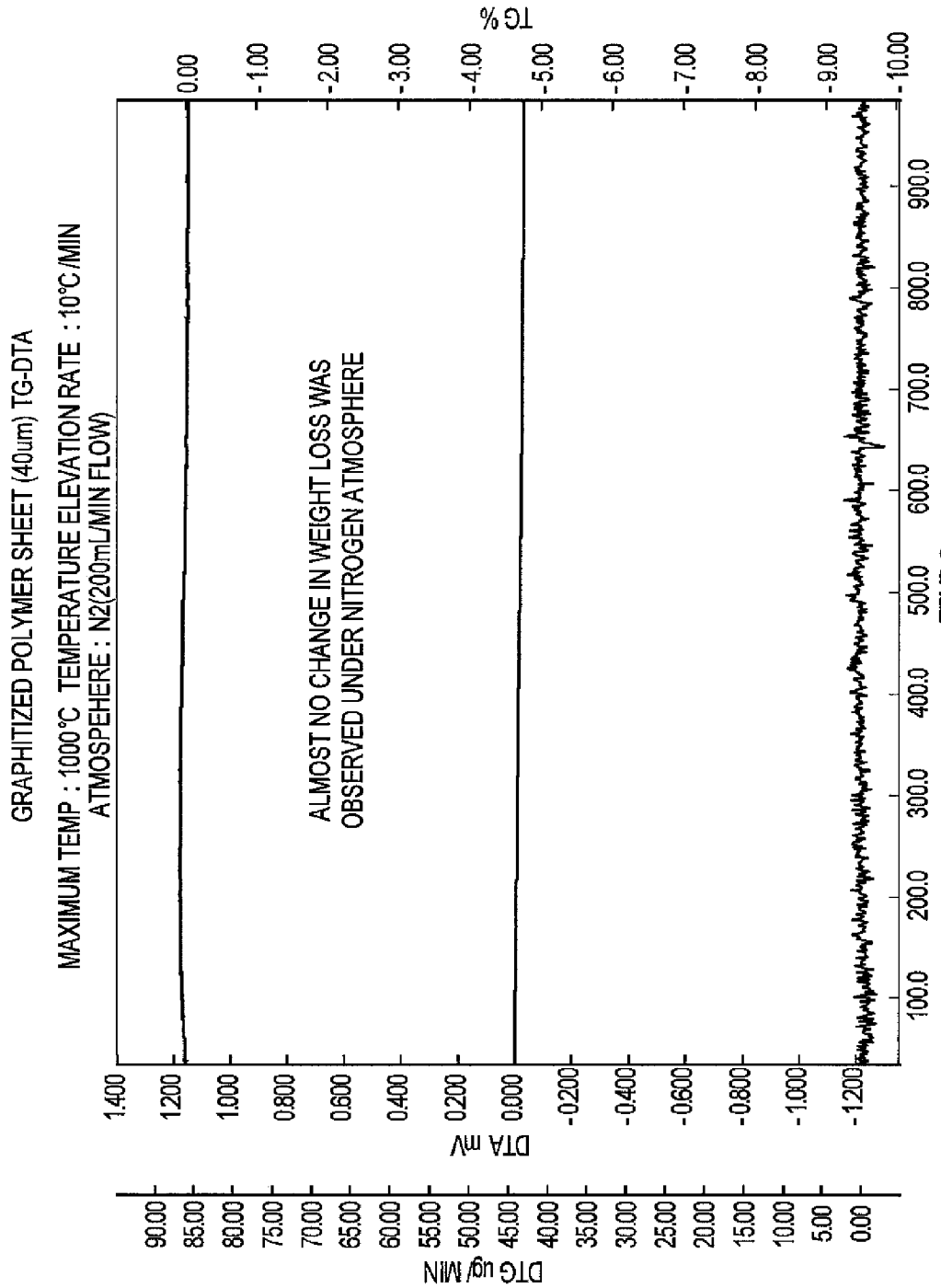
FIG. 17 is a result of TG analysis for graphitized polymer sheet
Figure 18:
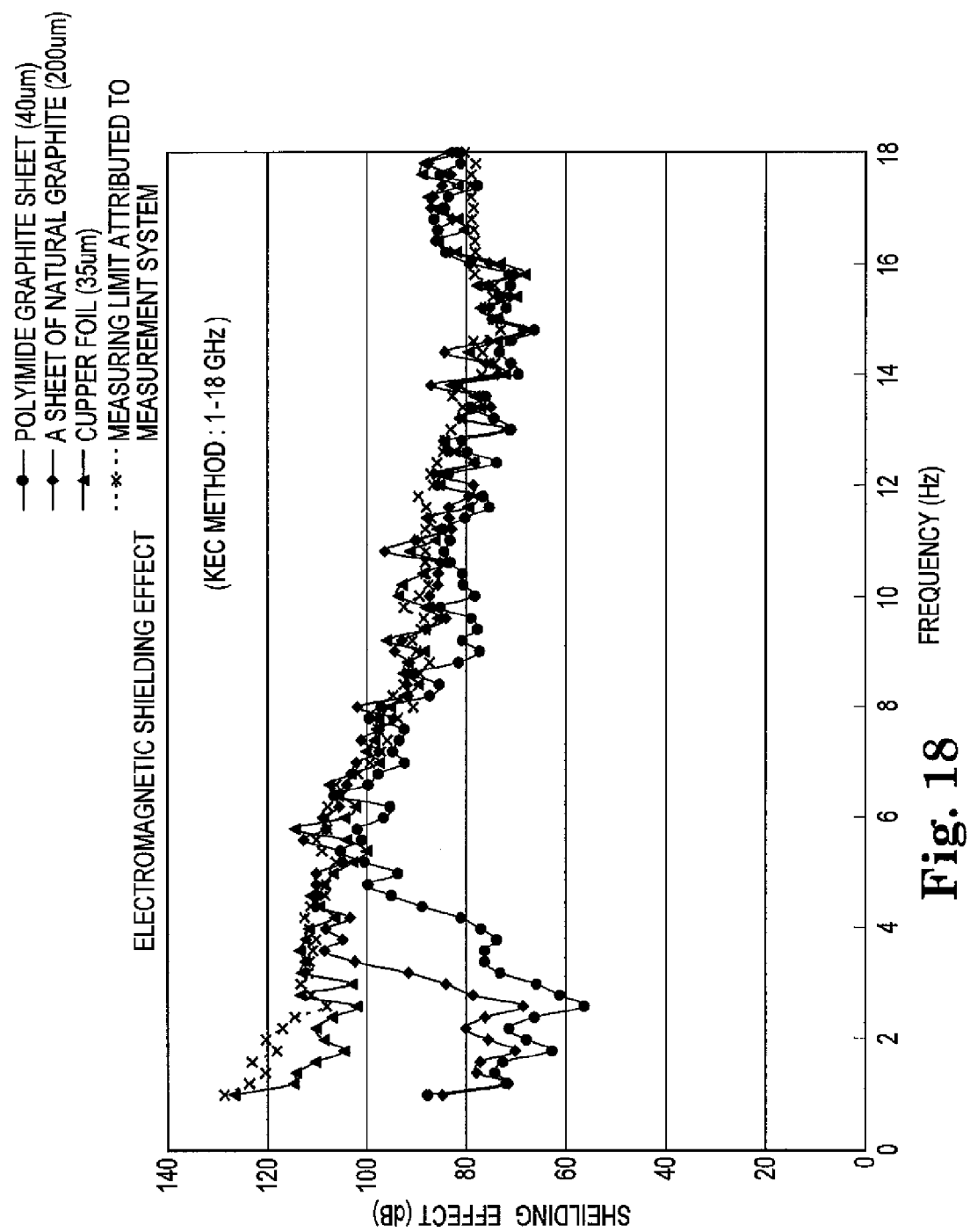
FIG. 18 is a result of Electromagnetic shielding effect.

Heat flux is as shown in FIG. 7. The heat flux remained below 3.4 W/cm$^2$ (3.0 BTU/ft2·s), which is the FAA standard, even after 8 minutes.

Evaluation through picture frame test was carried out as in the burn-through test, except that each sheet is affixed on a 31.75 inch×17.75 inch frame.

Thermographic measurement was conducted with a thermograph, TH71-707 produced by NEC/San-Ei Instruments, Ltd.

"Before pressing" refers to a graphite sheet in a state after the polyimide is carbonized and graphitized but before pressing. In this state, air is borne between graphite layers and the heat insulation effect is high.

It has been found that the graphite sheets have a higher frame barrier effect than Nextel. They also show that heat is diffused faster in the graphitized polyimide sheet among the graphite. Due to this reason, the temperature at the back side of the graphitized polyimide sheet from the flame was lowest.

Formation of heat spots can be prevented more easily with graphite sheets than with Nextel. Among the graphite, the graphitized polyimide sheets more easily prevent heat spots than natural graphite sheets and decrease the probability of burning a combustible located at the opposite side of the sheet. Consequently, the heat flux of the graphite sheets is lower, and, among the graphite sheets, the PI graphite sheets have a lower heat flux.

The results of the burnthrough test and the picture frame test are summarized in Table 4.

It was confirmed that the graphite sheets had an electromagnetic shielding property in addition to the fire barrier property.

The electromagnetic shielding effect was measured in accordance with a KEC method (1 to 18 GHz). SIGNAL GENERATOR MG3601 produced by ANRITSU was used to send electromagnetic waves, PRE AMPLIFIER 8449B (1 to 26.5 GHz) produced by HEWEKETT PACKARD was used as an amplifier (amplification of electromagnetic waves) and SPECTRUM ANALYZER 8564E (30 Hz to 40 GHz) produced by HEWEKETT PACKARD was used to receive the electromagnetic waves.

As described above, the graphite sheets have fire barrier effects superior to that of a commercially product. A comparison between natural graphite sheets and PI graphite sheets among graphite sheets by 3D-MASS shows that larger amounts of lower-molecular-weight compounds are contained in natural graphite. The comparison between the natural graphite sheets and the graphitized polyimide sheets also revealed differences indicated in Table 3. The properties described in the tables were determined as described below. Emissivity was measured with an emissivity meter, TSS-5X produced by Japan Sensor Corporation.

[Thermal Conductivity]

The thermal conductivity of a graphite film can be calculated by the following formula (1):

$$\lambda = \alpha \times d \times Cp \qquad (1)$$

In formula (1), $\lambda$ represents thermal conductivity, $\alpha$ represents thermal diffusivity, d represents density, and Cp represents specific heat capacity. The thermal diffusivity, density, and specific heat capacity of the graphite film can be determined by the processes described below.

(Measurement of Thermal Diffusivity of a Graphite Film in a Plane Direction by Optical Alternating Current Method)

An optical AC method thermal diffusivity meter (LaserPit available from ULVAC Inc.) was used to determine the thermal diffusivity. A 4×40 mm sample was cut out from a graphite film and analyzed in an atmosphere of 20° C. at 10 Hz.

(Measurement of Thermal Diffusivity of Graphite Film in Thickness Direction)

In measuring the thermal diffusivity and thermal conductivity of a graphite film in the thickness direction by a laser flash technique, LFA-502 produced by Kyoto Electronics Manufacturing Co., Ltd., in compliance with Japanese Industrial Standard (JIS) R1611-1997 was used. A graphite film was cut to a diameter of 10 mm, a black body spray produced by Tasco Japan Co. Ltd., was sprayed toward both sides of the film, and the thermal diffusivity in the thickness direction was measured by a laser flash technique at room temperature.

[Measurement of Graphite Film Density]

The density of a graphite film was calculated by dividing the weight (g) of a graphite film by a volume (cm³) obtained by multiplying the length, width, and thickness of the graphite film. The thickness of the graphite film was determined by measuring the thickness of a 50 mm×50 mm film with a thickness gauge (HEIDENHAIN-CERTO produced by Heidenhain) in a thermostatic chamber at 25° C. at any ten points and taking the average of the thicknesses. A higher density means a more extensive graphitization.

(Measuring Specific Heat Capacity of a Graphite Film)

The specific heat capacity of a graphite film was measured with differential scanning calorimeter DSC220CU, a thermal analysis system produced by SII NanoTechnology Inc., by elevating the temperature from 20° C. to 260° C. at a rate of 10° C./min under nitrogen stream (30 ml/min).

The thermal conductivity in the plane direction was calculated from the thermal diffusivity, density, and specific heat capacity of the graphite film in the plane direction, and the thermal conductivity in the thickness direction was calculated from the thermal diffusivity, density, and specific heat capacity of the graphite film in the thickness direction. The larger the values of thermal conductivity and diffusivity, the higher the heat conducting property.

[Electrical Conductivity]

The electrical conductivity was measured by a four-terminal technique. In particular, after a filmy graphite about 3 mm×6 mm in size was prepared and observed with an optical microscope to confirm absence of rupture or wrinkle in the sample, external electrodes were formed at two ends with silver paste and internal electrodes were formed between the external electrodes with a silver paste. A constant current generator ("programmable current source 220" produced by Keithley Instruments Inc.) was used to apply a 1 mA constant current from between the external electrodes, and the voltage between the internal electrodes was measured with a voltmeter (Nano Voltometer 181 produced by Keithley Instruments Inc). The electrical conductivity was calculated by assigning values to a formula, (applied current/measurement voltage)×(distance between internal electrodes/sample cross-sectional area).

[Water Absorption]

The water absorption of the film was measured as below. A film was dried at 100° C. for 30 minutes to be absolutely dried, and a 10 cm-square sample 25 μm in thickness was prepared. The weight of the sample was measured and assumed to be A1. The 10 cm-square sample 25 μm in thickness was immersed in distilled water at 23° C. for 24 hours, the surfaces were wiped to remove water, and the weight was immediately measured. This weight was assumed to be A2. The water absorption was determined from the following formula:

$$\text{Water absorption (\%)} = (A2-A1) \div A1 \times 100$$

[Tensile Strength]

The tensile strength and tensile modulus of graphite films in forms of single units and composites were measured with Strograph VES1D produced by Toyo Seiki Seisaku-sho, Ltd., in accordance with ASTM-D-882. The measurement was conducted at a chuck-chuck distance of 100 mm and a tensile rate of 50 mm/min at room temperature three times and the average was used.

[MIT Folding Endurance]

MIT folding endurance test was conducted on a graphite film. A graphite film cut to 1.5× to 10 cm was subjected to test using MIT Folding Endurance Tester Type D produced by Toyo Seiki Co., at a test load of 100 gf (0.98 N), a rate of 90 times/min, and a bending radius R of 1 mm. The bending angle was 90° to the left and fight.

[Oxygen and Hydrogen Permeability]

The oxygen permeability of a graphite film was measured with GTR-20XAFK produced by GTR Tec Corporation. G2700T produced by Yanako Technical Science Inc., was used to conduct gas chromatography. Measurement was conducted by an equal-pressure method (in compliance with JIS K-7126 and ISO 15105-1) at a test gas (oxygen) flow of 39.2 ml/min, 25° C., and 0% RH while using helium gas as the carrier gas. The measurement was conducted five times and the average of the results was used. The hydrogen permeability of a graphite film was measured with GTR-20×AFK produced by GTR Tec Corporation, and G2700T produced by Yanako Technical Science Inc., was used to conduct gas chromatography. Measurement was conducted by an equal-pressure method (in compliance with JIS K-7126 and ISO 15105-1) at a test gas (hydrogen) flow of 38.5 ml/min, 25° C., and 0% RH while using argon gas as the carrier gas. The measurement was conducted five times and the average of the results was used.

[TG Analysis (Differential Thermal Analysis)]

The differential thermal analysis of a graphite film was conducted with TG/DTA-6300 (thermo-gravimetric/differential thermal analyzer) produced by Seiko Instruments Inc., while using α alumina as the reference, at a temperature elevation rate of 10.0° C./min and a maximum temperature of 1000° C.

TABLE 2

|  |  | 100 μm A sheet of natural graphite | 250 μm A sheet of natural graphite | 25 μm Graphitized polyimide sheet | 40 μm Graphitized polyimide sheet | 65 μm Graphitized polyimide sheet | Ceramic paper (Nextel 312) |
|---|---|---|---|---|---|---|---|
| Burn through test | Photograph | — | — | ○ | ○ | — | — |
|  | Heat flux | — | — | ○ | ○ | — | — |
|  | Thermograph | — | — | ● | ● | — | — |
| Picture frame test | Heat flux | ○ | ○ | ○ | ○ | ○ | ○ |
|  | Temperature | ○ | ○ | ○ | ○ | ○ | ○ |
|  | Thermograph | ○ | ○ | ○ | ○ | ○ | ○ |
| TDS |  | — | ○ | — | ○ | — | ● |
| TG |  | — | ○ | — | ○ | — | ● |
| Electromagnetic shield |  | — | ○ | — | ○ | — | — |

○: Measurement results were obtained.

TABLE 3

|  | 100 μm A sheet of natural graphite Natural graphite | 250 μm A sheet of natural graphite Natural graphite | 25 μm Graphitized polyimide sheet PI graphite | 40 μm Graphitized polyimide sheet PI graphite | 65 μm Graphitized polyimide sheet PI graphite | Ceramic paper (Nextel 312) Nextel |
|---|---|---|---|---|---|---|
| Thickness (μm) | 100 | 250 | 25 | 40 | 65 | 280 |
| Weight (g/m$^2$) | 120 | 250 | 50 | 75 | 75 | 72 |
| Density (g/cm$^3$) | 1.2 | 1 | 1.95 | 1.95 | 1.15 | 0.26 |
| Thermal conductivity (W/Mk) Plane direction | 250 | 200 | 1250 | 1250 | 740 | <10 |
| Thermal conductivity (W/Mk) Thickness direction | 5 | 5 | 5 | 5 | 5 | <1 |
| Electrical conductivity (S/cm) | 1000 | 950 | 11500 | 11500 | 6780 | <0 |
| Emissivity | 0.45 | 0.45 | 0.35 | 0.35 | 0.45 | 0.89 |
| Oxygen permeability (cc/m$^2$ · day) | $3.0 \times 10^6$ | $2.6 \times 10^6$ | $<5 \times 10^1$ | $<5 \times 10^1$ | $<5 \times 10^1$ | $>1 \times 10^7$ |
| Hydrogen permeability (cc/m$^2$ · day) | $9.5 \times 10^6$ | $8.6 \times 10^6$ | $<5 \times 10^1$ | $<5 \times 10^1$ | $<5 \times 10^1$ | $>1 \times 10^7$ |
| Water absorption (%) | 50% | 49% | 0% | 0% | 0 | 68% |
| MIT (R2: 135°) (times) | 50 | <10 | >10000 | >10000 | 1000 | <10 |
| Tensile strength (MPa) | 10 | 10 | >40 | >40 | >20 | >1000 |

TABLE 4

|  |  |  |  | 100 μm A sheet of natural graphite Natural graphite | 250 μm A sheet of natural graphite Natural graphite | 25 μm Graphitized polyimide sheet PI graphite | 40 μm Graphitized polyimide sheet PI graphite | 65 μm Graphitized polyimide sheet PI graphite | Ceramic paper (Nextel 312) Nextel |
|---|---|---|---|---|---|---|---|---|---|
| Thickness (μm) |  |  |  | 100 | 250 | 25 | 40 | 65 | 280 |
| Picture frame test |  |  |  |  |  |  |  |  |  |
| After 4 min | Rear side | Heat Flux | (BTU/ft$^2$ · s)/(W/cm$^2$) | 2.19/2.61 | 2.29/2.60 | 1.86/2.11 | 1.97/2.24 | 1.93/2.19 | 3.12/3.55 |
|  |  | Temperature | (F.)/(° C.) | 446 F./230° C. | 511 F./266° C. | 416 F./213° C. | 416 F./214° C. | 432 F./222° C. | 580 F./304° C. |
|  | Rear surface | Heat Flux(W/cm$^2$) |  | 3.68 | 4.27 | 1.33 | 1.27 | 1.23 | 8.45 |
|  |  | Temperature (° C.) |  | 823° C. | 864° C. | 631° C. | 622° C. | 560° C. | 864° C. |
| After 6 min | Rear side | Heat Flux | (BTU/ft$^2$ · s)/(W/cm$^2$) | 2.30/2.61 | 2.32/2.64 | 2.05/2.33 | 2.04/2.32 | 1.94/2.20 | 3.19/3.63 |
|  |  | Temperature | (F.)/(° C.) | 490 F./254° C. | 540 F./282° C. | 454 F./234° C. | 459 F./237° C. | 459 F./237° C. | 604 F./318° C. |
|  | Rear surface | Heat Flux(W/cm$^2$) |  | 4.02 | 4.76 | 1.34 | 1.34 | 1.26 | 8.36 |
|  |  | Temperature |  | 847° C. | 895° C. | 634° C. | 634° C. | 564° C. | 861° C. |
| Burn through test |  |  |  |  |  |  |  |  |  |
| After 4 minutes | Heat Flux |  | (BTU/ft$^2$ · s)/(W/cm$^2$) | — | — | 1.36/1.55 | 1.29/1.46 | — | — |
| After 6 minutes | Heat Flux |  | (BTU/ft$^2$ · s)/(W/cm$^2$) | — | — | 1.35/1.54 | 1.37/1.56 | — | — |
| After 16 minutes | Heat Flux |  | (BTU/ft$^2$ · s)/(W/cm$^2$) | — | — | 1.30/1.48 | 1.24/1.41 | — | — |

Example 4

Samples used in evaluation and experimental results are shown in Table 5 and 6. The graphite sheets in size of 20 cm×20 cm were cut from each sample. Circular flame at the temperature of around 1000° C. from burner is jetted to the area within 5 cm radius from the center of the sheet. The following properties after exposure to flame were observed.

Appearance (Unevenness of the Sheet Surface)
○○○ non-bubbled
○○ slightly bubbled but partially
○ slightly bubbled
Δ bubbled and uneven surface
X extremely bubbled and markedly uneven Strength
○○○ no change in the strength
○○ extremely slight degradation in the strength
○ slight degradation in the strength
Δ degradation in the strength
X drastic degradation in the strength Temperature of Back Side
○○○ Extremely drastic decrease in the temperature
○○ Drastic decrease in the temperature
○ Decrease in the temperature
Δ Slight decrease in the temperature Generated gas having molecular weight is measured for sample [B] in table 5 and sample [I] in table 6.

TABLE 5

|  |  | [A] Graphitized polyimide sheet obtained by thermally treating a polyimide film having a thickness of 50 μm at a temperature of 2900° C. followed by rolling the resultant film | [B] Graphitized polyimide sheet obtained by thermally treating a polyimide film having a thickness of 75 μm at a temperature of 2900° C. followed by rolling the resultant film | [C] Graphitized polyimide sheet obtained by thermally treating a polyimide film having a thickness of 75 μm at a temperature of 2900° C., a temperature at 2000° C., in vacuum, a temperature at 2900° C., under argon gas and followed by rolling the resultant film | [D] Graphite sheet obtained by compressing exfoliated graphite followed by thermally treating the resulting film at a temperature of 1000° C. under Nitrogen gas | [E] Graphite sheet obtained by compressing exfoliated graphite followed by thermally treating the resulting film at a temperature of 2000° C. under Nitrogen gas |
|---|---|---|---|---|---|---|
| Thickness (μm) |  | 25 | 40 | 35 | 250 | 250 |
| Density (g/cm$^3$) |  | 1.95 | 1.95 | 2.1 | 1 | 1 |
| Thermal conductivity (W/Mk) | Plane direction | 1250 | 1250 | 1400 | 220 | 260 |
|  | Thickness direction | 5 | 5 | 5 | 5 | 5 |
| Electrical conductivity (S/cm) |  | 11500 | 11500 | 11400 | 1200 | 2000 |
| MIT (R2: 135°) (times) |  | >10000 | >10000 | >10000 | 10 | 10 |
| Emissivity |  | 0.35 | 0.35 | 0.32 | 0.44 | 0.43 |
| Oxygen permeability (cc/m$^2$·day) |  | <5.0 × 10$^1$ | <5.0 × 10$^1$ | <5 × 10$^1$ | 3.0 × 10$^5$ | 9.0 × 10$^4$ |
| Hydrogen permeability (cc/m$^2$·day) |  | <5.0 × 10$^1$ | <5.0 × 10$^1$ | <5 × 10$^1$ | 9.1 × 10$^5$ | 3.5 × 10$^5$ |
| Water absorption (%) |  | <0.1% | <0.1% | <0.1% | 35% | 25% |
| Generated gas (molecules gas/mg graphite) | 28 (CO) | 1.5E+15 | 1.9E+15 | 1.2E+15 | 9.0E+15 | 7.0E+15 |
|  | 44 (CO2) | 9.5E+14 | 1.0E+15 | 7.0E+14 | 3.6E+15 | 3.0E+15 |
| Results after burner flame treatment | appearance | ○○○ | ○○○ | ○○○ | ○ | ○○ |
|  | Strength | ○○○ | ○○○ | ○○○ | ○ | ○ |
|  | Temperature of back side | ○ | ○○ | ○○○ | Δ | ○ |

TABLE 6

|  |  | [F] Graphite sheet obtained by compressing exfoliated graphite particle followed by thermally treating the resulting film at a temperature of 2000° C. in vacuum | [G] Graphite sheet obtained by compressing exfoliated graphite particle followed by thermally treating the resulting film at a temperature of 2000° C. under chlorine gas | [H] Graphite sheet obtained by compressing exfoliated graphite particle followed by thermally treating the resulting film at a temperature of 2000° C. in vacuum and post-rolling | [I] Graphite sheet obtained by compressing exfoliated graphite particle | [G] Graphite sheet obtained by compressing a composition consisting of 60% of exfoliated graphite particle and 40% of unexfoliated graphite particle |
|---|---|---|---|---|---|---|
| Thickness (μm) |  | 250 | 250 | 250 | 250 | 250 |
| Density (g/cm$^3$) |  | 1 | 1 | 1 | 1 | 1.5 |
| Thermal conductivity (W/Mk) | Plane direction | 270 | 240 | 290 | 200 | 200 |
|  | Thickness direction | 5 | 5 | 5 | 5 | 8 |
| Electrical conductivity (S/cm) |  | 2500 | 1800 | 2500 | 950 | 950 |

TABLE 6-continued

|  |  | [F] Graphite sheet obtained by compressing exfoliated graphite particle followed by thermally treating the resulting film at a temperature of 2000° C. in vacuum | [G] Graphite sheet obtained by compressing exfoliated graphite particle followed by thermally treating the resulting film at a temperature of 2000° C. under chlorine gas | [H] Graphite sheet obtained by compressing exfoliated graphite particle followed by thermally treating the resulting film at a temperature of 2000° C. in vacuum and post-rolling | [I] Graphite sheet obtained by compressing exfoliated graphite particle | [G] Graphite sheet obtained by compressing a composition consisting of 60% of exfoliated graphite particle and 40% of unexfoliated graphite particle |
|---|---|---|---|---|---|---|
| MIT (R2: 135°) (times) | | 10 | 10 | 30 | 10 | 10 |
| Emissivity | | 0.41 | 0.42 | 0.40 | 0.45 | 0.60 |
| Oxygen permeability (cc/m$^2$·day) | | $2.5 \times 10^4$ | $9.0 \times 10^5$ | $1.0 \times 10^4$ | $2.6 \times 10^6$ | $5.6 \times 10^6$ |
| Hydrogen permeability (cc/m$^2$·day) | | $9.3 \times 10^4$ | $3.4 \times 10^5$ | $3.5 \times 10^4$ | $8.6 \times 10^6$ | $1.5 \times 10^7$ |
| Water absorption (%) | | 20% | 30% | 20% | 40% | 55% |
| Generated gas (molecules gas/mg graphite) | 28 (CO) | 4.0E+15 | 5.5E+15 | 4.0E+15 | 3.2E+16 | >10E+16 |
| | 44 (CO2) | 2.0E+15 | 2.5E+15 | 2.0E+15 | 4.9E+15 | >10E+15 |
| Results after burner flame treatment | appearance | ◯◯ | ◯◯ | ◯◯ | Δ | X |
| | Strength | ◯◯ | ◯ | ◯◯ | Δ | X |
| | Temperature of back side | ◯ | ◯ | ◯◯ | Δ | Δ |

Figure 19:
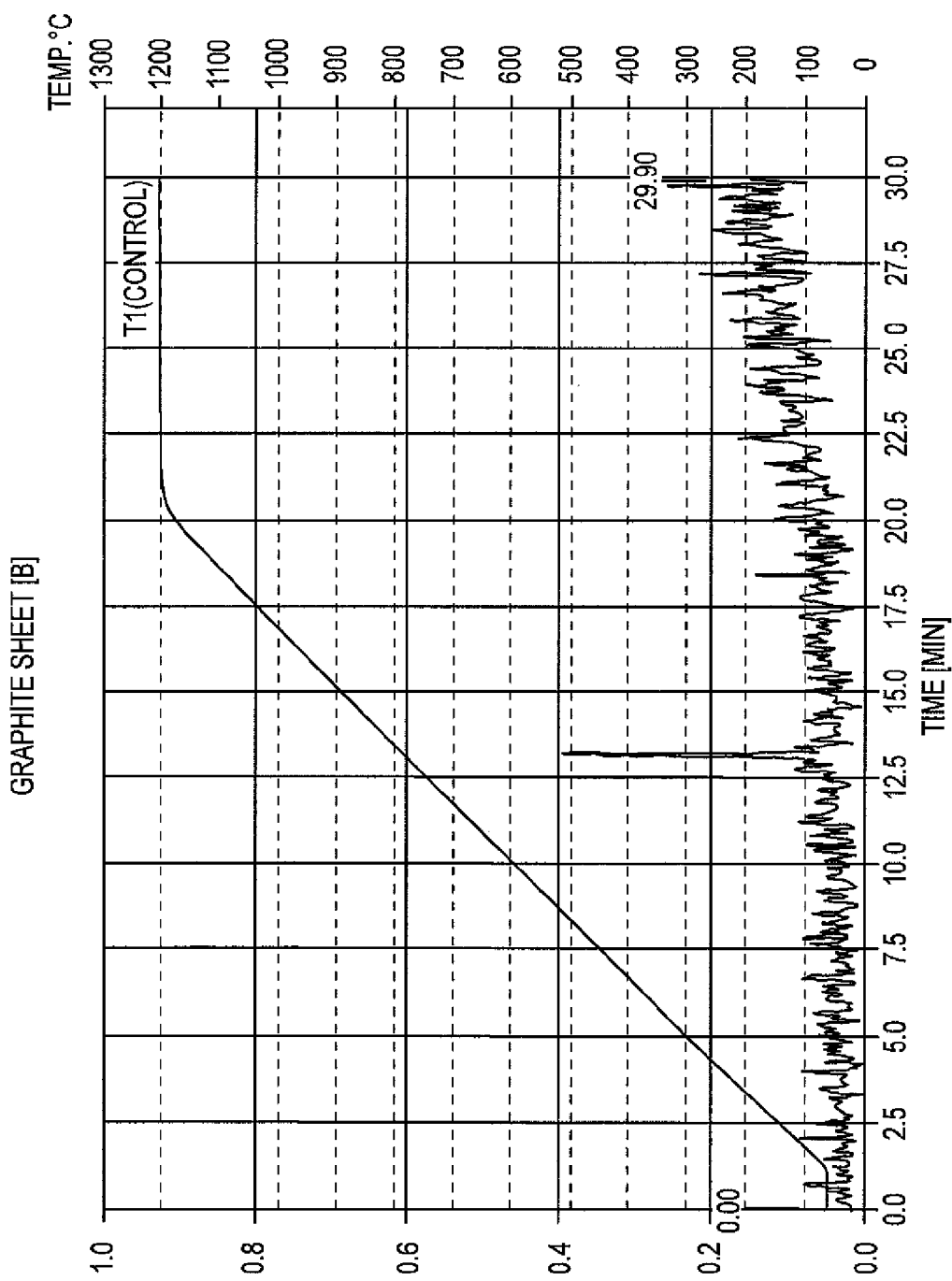
FIG. 19 is chart showing the result of 3D-MASS measurements for a sheet of the present invention.

FIG. 19 is a chart showing the result of 3D-MASS measurements for generated carbon monoxide gas from Graphite Sheet B as described in Table 5.

Figure 20:
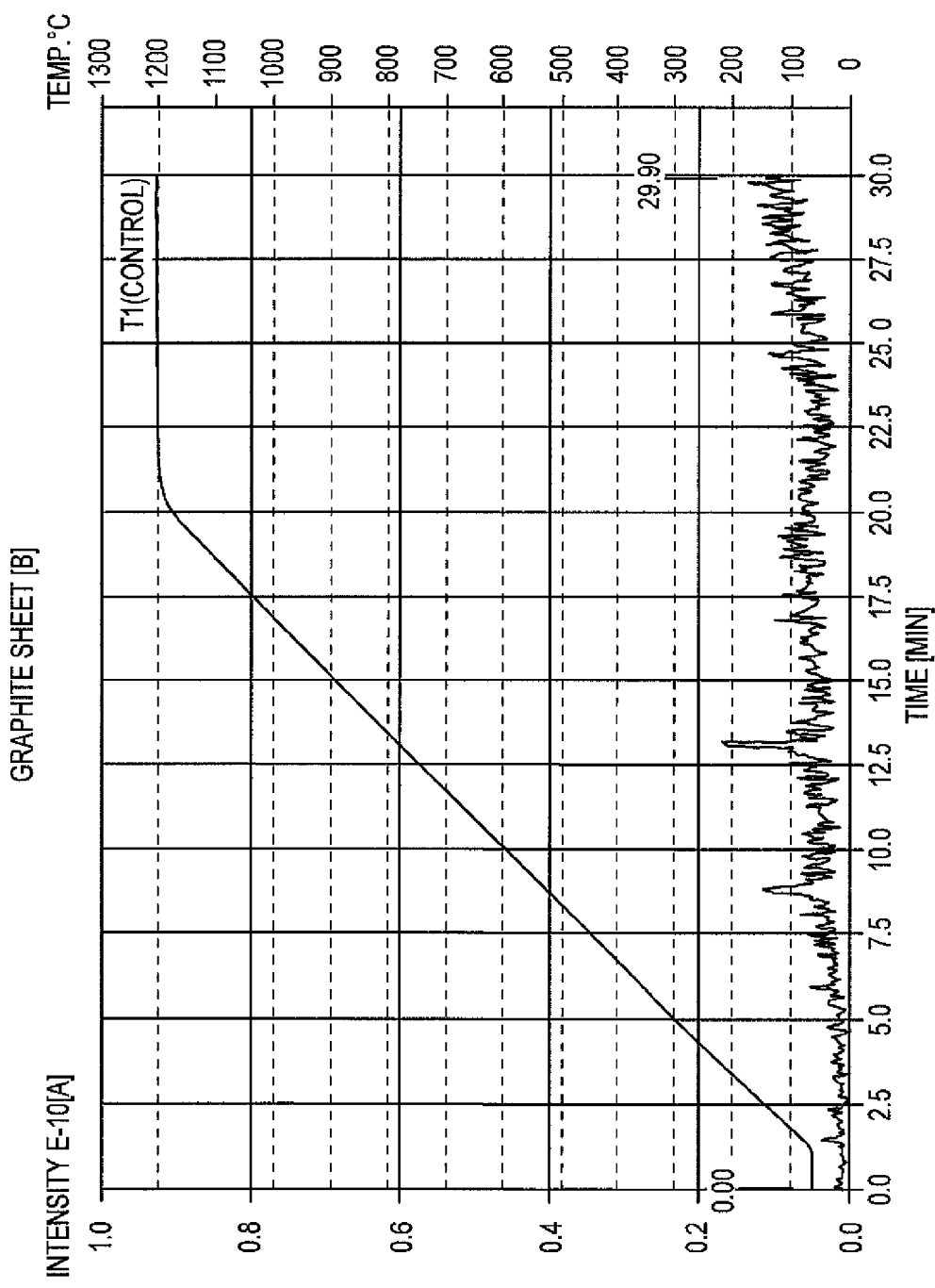
FIG. 20 is chart showing the result of 3D-MASS measurements for a sheet of the present invention.

FIG. 20 is a chart showing the result of 3D-MASS measurements for generated carbon dioxide gas from Graphite Sheet B as described in Table 5.

Figure 21:
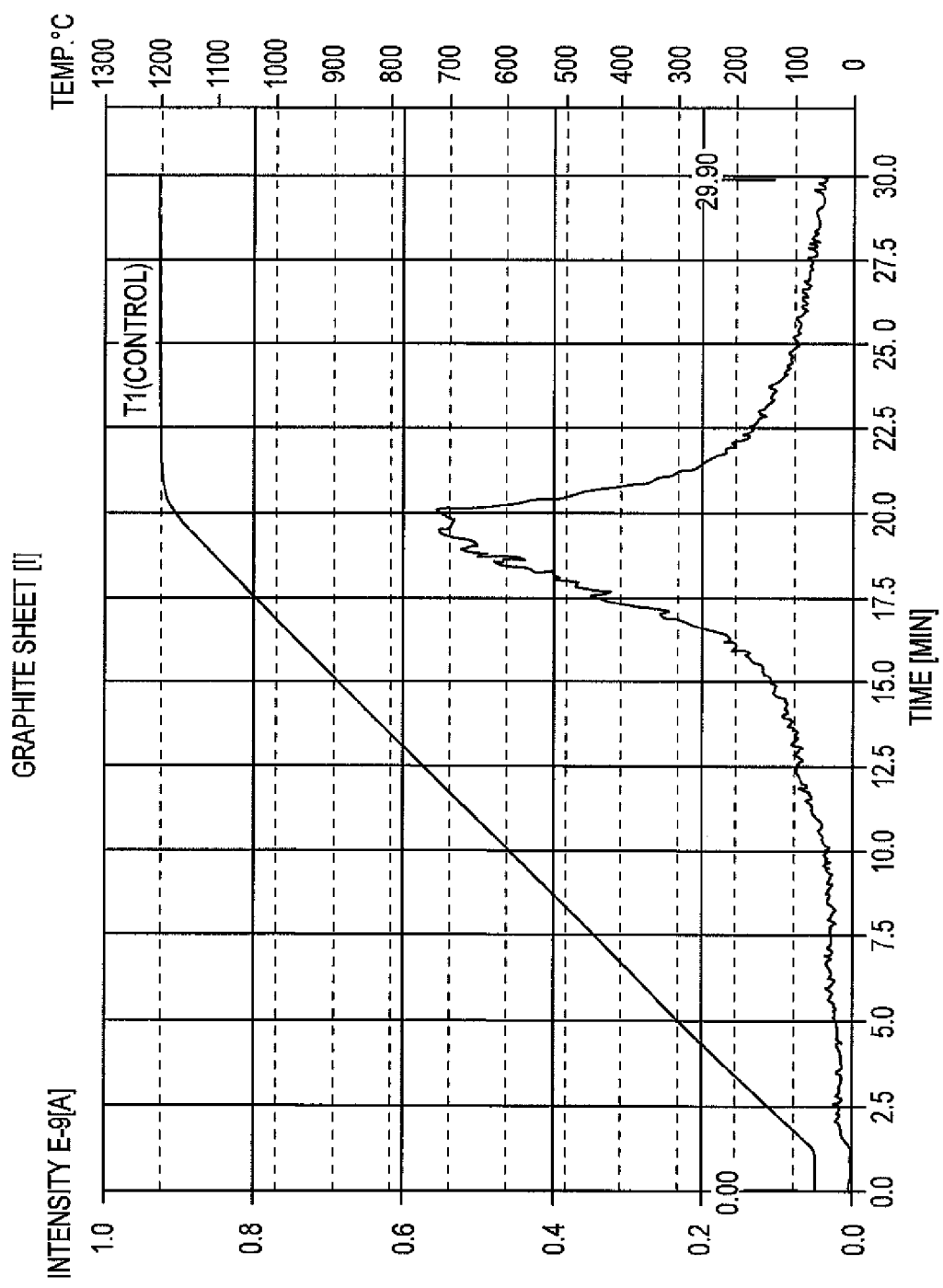
FIG. 21 is chart showing the result of 3D-MASS measurements for a sheet of the present invention.

FIG. 21 is a chart showing the result of 3D-MASS measurements for generated carbon monoxide gas from Graphite Sheet I as described in Table 6.

Figure 22:
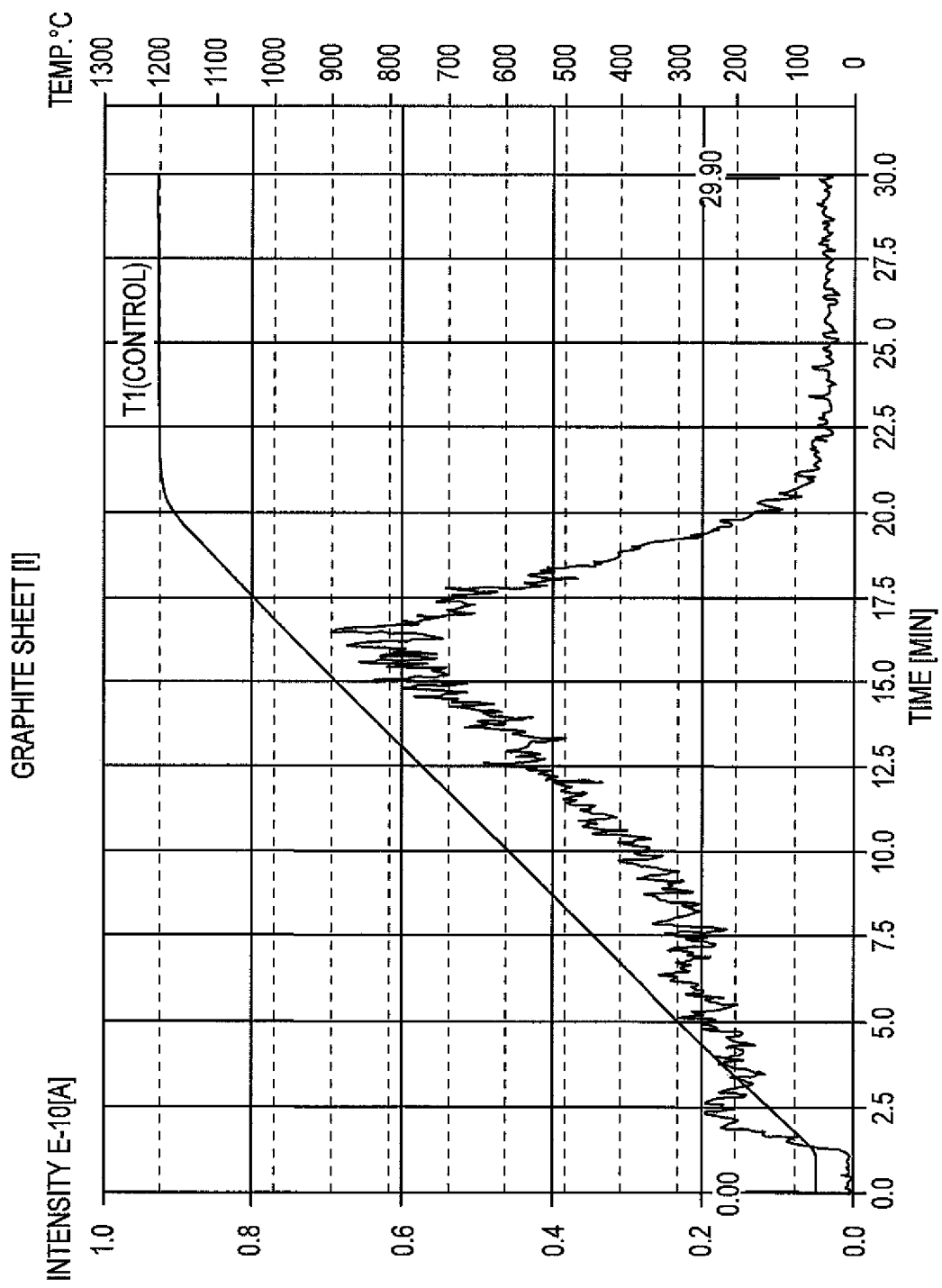
FIG. 22 is chart showing the result of 3D-MASS measurements for a sheet of the present invention.

FIG. 22 is a chart showing the result of 3D-MASS measurements for generated carbon dioxide gas from Graphite Sheet I as described in Table 6.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of providing fire barrier protection in an aircraft comprising
   a) providing a fire barrier system for use in aircraft comprising a flexible graphite sheet, and
   b) installing the fire barrier system in the aircraft;
   wherein the flexible graphite sheet is a continuous film of graphite that has been prepared from a starting material polymer sheet that has been heated to a high temperature for a time sufficient to transform the polymer sheet into a flexible graphitized polymer sheet, and the flexible graphitized polymer sheet has a thermal conductivity in the plane direction of 300 W/mK or more and an Oxygen permeability and/or Hydrogen permeability of less than $5 \times 10^1$ cc/m$^2$·day.

2. A method of providing fire barrier protection in a ship comprising
   a) providing a fire barrier system for use in a ship comprising a flexible graphite sheet, and
   b) installing the fire barrier system in the ship;
   wherein the flexible graphite sheet is a continuous film of graphite that has been prepared from a starting material polymer sheet that has been heated to a high temperature for a time sufficient to transform the polymer sheet into a flexible graphitized polymer sheet, and the flexible graphitized polymer sheet has a thermal conductivity in the plane direction of 300 W/mK or more more and an Oxygen permeability and/or Hydrogen permeability of less than $5 \times 10^1$ cc/m$^2$·day.

3. A method of providing fire barrier protection in an offshore drilling platform comprising
   a) providing a fire barrier system for use in an offshore drilling platform comprising a flexible graphite sheet, and b) installing the fire barrier system in the offshore drilling platform;
   wherein the flexible graphite sheet is a continuous film of graphite that has been prepared from a starting material polymer sheet that has been heated to a high temperature for a time sufficient to transform the polymer sheet into a flexible graphitized polymer sheet, and the flexible graphitized polymer sheet has a thermal conductivity in the plane direction of 300 W/mK or more and an Oxygen permeability and/or Hydrogen permeability of less than $5 \times 10^1$ cc/m$^2$·day.

4. The method of claim 1, the system comprising a laminate for enclosing an insulation bag, the laminate comprising as one of the layers the flexible graphitized polymer sheet.

5. The method of claim 1, the system comprising an insulation blanket comprising as one layer of the insulation blanket the flexible graphitized polymer sheet.

6. The method of claim 1, wherein the amount of carbon monoxide gas generated from the flexible graphitized polymer sheet thus prepared is under 5.0 E+16 molecules CO/mg of graphite sheet when measured by 3D-MASS.

7. The method of claim 1, wherein the flexible graphitized polymer sheet has an emissivity of 0.45 or less.

8. A method of providing fire barrier protection in an aircraft comprising
   a) providing a fire barrier system for use in aircraft comprising a flexible graphite sheet, and
   b) installing the fire barrier system in the aircraft;

wherein the flexible graphite sheet has been prepared from a starting material polymer sheet that has been heated to a high temperature for a time sufficient to transform the polymer sheet into a flexible graphitized polymer sheet, and the flexible graphitized polymer sheet has a thermal conductivity in the plane direction of 300 W/mK or more; and wherein the flexible graphitized polymer sheet has:

a thermal conductivity in the thickness direction of 1 to 20 W/mK; and the ratio of the thermal conductivity in the plane direction to the thermal conductivity in the thickness direction of 20 or more.

9. The method of claim 1, wherein the flexible graphitized polymer sheet exhibits in a picture frame test a heat flux of 3.4 W/cm$^2$ (3.0 BTU/ft$^2$·s) or less 6 minutes after start of the test and a temperature of 300° C. (527 F) or less 6 minutes after start of the test in a picture frame test.

10. The method of claim 1, wherein the flexible graphitized polymer sheet exhibits a heat flux of 3.4 W/cm$^2$ (3.0 BTU/ft$^2$·s) or less 6 minutes after start of the test in a picture frame test in a burn-through test.

11. The method of claim 1, wherein the flexible graphitized polymer sheet exhibits a heat flux of 8.0 W/cm$^2$ or less at the rear side of the graphitized polymer sheet 6 minutes after start of the test in a picture frame test.

12. The method of claim 1, wherein the flexible graphitized polymer sheet exhibits a temperature of 800° C. or less at the rear side of the graphitized polymer sheet 6 minutes after start of the test in a picture frame test.

13. The method of claim 1, wherein The MIT Folding Endurance of the flexible graphitized polymer sheet is 1000 times or more.

14. The method of claim 1, wherein the water absorption of the flexible graphitized polymer sheet is 1% or less.

15. The method of claim 1, wherein the gas permeability of the flexible graphitized polymer sheet is 100.0×10$^6$ cc/m$^2$·day or less.

16. The method of claim 1, wherein the flexible graphitized polymer sheet has a weight of from about 20 to about 250 g/m$^2$.

17. The method of claim 1, wherein the electrical conductivity of the flexible graphitized polymer sheet is 10000 S/cm or more.

18. The method of claim 1, wherein the flexible graphitized polymer sheet is adhered to a substrate or system component with a flame-retardant adhesive material.

19. A fire barrier system installed in an aircraft comprising a the flexible graphitized polymer sheet installed by the method of claim 1.

20. A fire barrier system installed in a ship comprising the flexible graphitized polymer sheet installed by the method of claim 2.

21. A fire barrier system installed in an offshore drilling platform comprising the flexible graphitized polymer sheet installed by the method of claim 3.

22. The method of claim 1, wherein the flexible graphitized polymer sheet has a thermal conductivity in the plane direction of 1000 W/mK or more.

23. The method of claim 1, wherein the flexible graphite sheet has been prepared from a starting material polyimide sheet that has been heated to a high temperature for a time sufficient to transform the polyimide sheet into a flexible graphitized polyimide sheet.

* * * * *